(12) United States Patent
Anati et al.

(10) Patent No.: US 9,219,708 B2
(45) Date of Patent: Dec. 22, 2015

(54) METHOD AND SYSTEM FOR REMOTELY AUTHENTICATING IDENTIFICATION DEVICES

(75) Inventors: Ram Anati, Hadera (IL); Maxim Glukhov, Jerusalem (IL); Dan Atsmon, Givataim (IL); Gavriel Speyer, Tel-Aviv (IL)

(73) Assignee: DialwareInc., Los Angeles, CA (US)

( * ) Notice: Subject to any disclaimer, the term of this patent is extended or adjusted under 35 U.S.C. 154(b) by 1246 days.

(21) Appl. No.: 10/668,109

(22) Filed: Sep. 22, 2003
(Under 37 CFR 1.47)

(65) Prior Publication Data

US 2004/0236819 A1    Nov. 25, 2004

Related U.S. Application Data

(63) Continuation of application No. PCT/IL02/00236, filed on Mar. 21, 2002, and a continuation-in-part of application No. PCT/IL01/00758, filed on Aug. 14, 2001, and a continuation-in-part of application No.
(Continued)

(51) Int. Cl.
*G06F 21/00* (2013.01)
*H04L 29/06* (2006.01)
(Continued)

(52) U.S. Cl.
CPC .......... *H04L 63/0218* (2013.01); *G06F 21/445* (2013.01); *G06Q 20/04* (2013.01); *G06Q 20/12* (2013.01); *G06Q 20/341* (2013.01);
(Continued)

(58) Field of Classification Search
CPC ..................... H04L 63/12; H04L 63/0218

USPC .......... 380/241; 709/231; 713/155, 156, 182, 713/185, 201, 159, 153; 726/2, 5; 329/300; 382/100; 235/492; 455/558
See application file for complete search history.

(56) References Cited

U.S. PATENT DOCUMENTS 2,990,646 A    7/1961  Berger
3,885,089 A *  5/1975  Callais et al. ................. 380/220
(Continued)

FOREIGN PATENT DOCUMENTS

CA    2345736    4/2000
DE    19645071   5/1998
(Continued)

OTHER PUBLICATIONS

Bhupendra K Ahuja, An Analog Front End for a Two-Chip 2400-bit/s Voice-Band Modem, Dec. 1987, Intel corporation, vol. sc-22, pp. 1-8.*
(Continued)

*Primary Examiner* — Monjour Rahim
(74) *Attorney, Agent, or Firm* — Roach Brown McCarthy & Gruber, P.C.; Kevin D. McCarthy

(57) ABSTRACT

A method of authenticating, using an authentication server, the use of an authentication device over a communication network via an intermediate communication device, comprising:
  receiving an authentication datagram by the intermediate device;
  protecting the datagram by the intermediate device, by at least one of changing, adding to, encrypting and signing of the datagram; and
  forwarding the datagram to the authentication server for authentication.

53 Claims, 8 Drawing Sheets

Related U.S. Application Data

09/853,017, filed on May 10, 2001, now Pat. No. 7,280,970.

(60) Provisional application No. 60/277,996, filed on Mar. 22, 2001, provisional application No. 60/278,010, filed on Mar. 22, 2001, provisional application No. 60/278,065, filed on Mar. 22, 2001.

(51) Int. Cl.
| | | |
|---|---|---|
| *G06F 21/44* | (2013.01) | |
| *G06Q 20/04* | (2012.01) | |
| *G06Q 20/12* | (2012.01) | |
| *G06Q 20/34* | (2012.01) | |
| *G06Q 20/38* | (2012.01) | |
| *G06Q 20/40* | (2012.01) | |
| *G07F 7/10* | (2006.01) | |

(52) U.S. Cl.
CPC ........ *G06Q 20/3823* (2013.01); *G06Q 20/4097* (2013.01); *G07F 7/1008* (2013.01); *H04L 63/0853* (2013.01); *H04L 63/12* (2013.01); *G06F 2221/2129* (2013.01)

(56) References Cited

U.S. PATENT DOCUMENTS

| | | | |
|---|---|---|---|
| 3,961,323 A | 6/1976 | Hartkorn | |
| 4,207,696 A | 6/1980 | Hyman et al. | |
| 4,231,184 A | 11/1980 | Corris et al. | |
| 4,264,978 A | 4/1981 | Whidden | |
| 4,335,183 A | 6/1982 | Hosaka | |
| 4,353,064 A | 10/1982 | Stamm | |
| 4,390,877 A | 6/1983 | Curran | |
| 4,479,995 A | 10/1984 | Suzuki et al. | |
| 4,612,472 A | 9/1986 | Kakizaki et al. | |
| 4,614,861 A | 9/1986 | Pavlov et al. | |
| 4,637,007 A | 1/1987 | Sakurai | |
| 4,640,034 A | 2/1987 | Zisholtz | |
| 4,641,374 A | 2/1987 | Oyama | |
| 4,670,746 A | 6/1987 | Taniguchi et al. | |
| 4,673,371 A | 6/1987 | Furukawa | |
| 4,677,657 A | 6/1987 | Nagata et al. | |
| 4,682,370 A | 7/1987 | Matthews | |
| 4,696,653 A | 9/1987 | McKeefery | |
| 4,716,376 A * | 12/1987 | Daudelin ...................... 329/300 | |
| 4,717,364 A | 1/1988 | Furukawa | |
| 4,739,398 A | 4/1988 | Thomas et al. | |
| 4,764,666 A | 8/1988 | Bergeron | |
| 4,766,294 A | 8/1988 | Nara et al. | |
| 4,814,591 A | 3/1989 | Nara et al. | |
| 4,818,855 A | 4/1989 | Mongeon et al. | |
| 4,840,602 A | 6/1989 | Rose | |
| 4,851,654 A | 7/1989 | Nitta | |
| 4,857,030 A | 8/1989 | Rose | |
| 4,874,935 A | 10/1989 | Younger | |
| 4,894,663 A | 1/1990 | Urbish et al. | |
| 4,918,416 A | 4/1990 | Walton et al. | |
| 4,924,075 A | 5/1990 | Tanaka | |
| 4,935,907 A | 6/1990 | Friedman | |
| 4,942,534 A | 7/1990 | Yokoyama et al. | |
| 4,961,229 A | 10/1990 | Takahashi | |
| 4,973,286 A | 11/1990 | Davison | |
| 4,978,840 A | 12/1990 | Anegawa | |
| 4,984,380 A | 1/1991 | Anderson | |
| 5,032,099 A | 7/1991 | Chan | |
| 5,072,103 A | 12/1991 | Nara | |
| 5,085,610 A | 2/1992 | Engel et al. | |
| 5,142,508 A | 8/1992 | Mitchell et al. | |
| 5,176,560 A | 1/1993 | Wetherell et al. | |
| 5,191,615 A | 3/1993 | Aldava et al. | |
| 5,209,695 A | 5/1993 | Rothschild | |
| 5,241,160 A | 8/1993 | Bashan et al. | |
| 5,280,267 A | 1/1994 | Reggiani | |
| 5,280,527 A | 1/1994 | Gullman et al. | |
| 5,289,273 A | 2/1994 | Lang | |
| 5,307,051 A | 4/1994 | Seldmayr | |
| 5,314,336 A | 5/1994 | Diamond et al. | |
| 5,317,636 A | 5/1994 | Vizcaino | |
| 5,324,038 A | 6/1994 | Sasser | |
| 5,333,171 A | 7/1994 | Wang et al. | |
| 5,356,326 A | 10/1994 | Ting | |
| 5,376,778 A | 12/1994 | Kreft | |
| 5,407,376 A | 4/1995 | Avital et al. | |
| 5,412,253 A | 5/1995 | Hough | |
| 5,416,829 A | 5/1995 | Umemoto | |
| 5,420,606 A | 5/1995 | Begum et al. | |
| 5,423,073 A | 6/1995 | Ogawa | |
| 5,426,979 A | 6/1995 | Kantorovich et al. | |
| 5,434,398 A | 7/1995 | Goldberg | |
| H1469 H | 8/1995 | Simonoff | |
| 5,452,901 A | 9/1995 | Nakada et al. | |
| 5,467,095 A | 11/1995 | Rodal et al. | |
| 5,479,408 A | 12/1995 | Will | |
| 5,481,535 A | 1/1996 | Hershey | |
| 5,492,290 A | 2/1996 | Quinn et al. | |
| 5,511,122 A * | 4/1996 | Atkinson ...................... 713/153 |
| 5,517,194 A | 5/1996 | Carroll et al. | |
| 5,522,089 A | 5/1996 | Kikinis et al. | |
| 5,522,623 A | 6/1996 | Soules et al. | |
| 5,523,749 A | 6/1996 | Cole et al. | |
| 5,539,819 A | 7/1996 | Sonoyama et al. | |
| 5,552,790 A | 9/1996 | Gunnarsson | |
| 5,579,537 A | 11/1996 | Takahisa | |
| 5,583,933 A | 12/1996 | Mark | |
| 5,585,787 A | 12/1996 | Wallerstein | |
| 5,590,038 A | 12/1996 | Pitroda | |
| 5,598,187 A | 1/1997 | Ide et al. | |
| 5,606,732 A | 2/1997 | Vignone, Sr. | |
| 5,615,111 A | 3/1997 | Raskas et al. | |
| 5,623,552 A | 4/1997 | Lane | |
| 5,629,867 A | 5/1997 | Goldman | |
| 5,629,981 A | 5/1997 | Nerlikar | |
| 5,635,701 A | 6/1997 | Gloton | |
| 5,638,047 A | 6/1997 | Orloff et al. | |
| 5,638,450 A | 6/1997 | Robson | |
| 5,640,003 A | 6/1997 | Makino | |
| 5,646,907 A | 7/1997 | Maccabee | |
| 5,647,787 A | 7/1997 | Raviv et al. | |
| 5,647,834 A | 7/1997 | Ron | |
| 5,655,945 A | 8/1997 | Jani | |
| 5,697,829 A | 12/1997 | Chainani et al. | |
| 5,698,836 A | 12/1997 | Fujioka | |
| 5,706,031 A | 1/1998 | Brendzel et al. | |
| 5,708,853 A | 1/1998 | Sanemitsu | |
| 5,717,168 A | 2/1998 | Debuisser et al. | |
| 5,719,387 A | 2/1998 | Fujioka | |
| 5,731,757 A | 3/1998 | Layson, Jr. | |
| 5,740,232 A | 4/1998 | Pailles et al. | |
| 5,742,677 A | 4/1998 | Pinder et al. | |
| 5,745,555 A | 4/1998 | Mark | |
| 5,745,591 A | 4/1998 | Feldman | |
| 5,746,602 A | 5/1998 | Kikinis | |
| 5,752,880 A | 5/1998 | Gabai et al. | |
| 5,761,606 A | 6/1998 | Wolzien | |
| 5,763,862 A | 6/1998 | Jachimowicz et al. | |
| 5,764,512 A | 6/1998 | Michel et al. | |
| 5,764,763 A | 6/1998 | Jensen et al. | |
| 5,764,900 A | 6/1998 | Morris et al. | |
| 5,768,686 A | 6/1998 | LeBlanc et al. | |
| 5,774,791 A | 6/1998 | Strohallen et al. | |
| 5,778,071 A | 7/1998 | Caputo et al. | |
| 5,778,187 A | 7/1998 | Monteiro et al. | |
| 5,786,764 A | 7/1998 | Engellenner | |
| 5,786,988 A | 7/1998 | Harari | |
| 5,789,733 A | 8/1998 | Jachimowicz et al. | |
| 5,793,305 A | 8/1998 | Turner et al. | |
| 5,800,243 A | 9/1998 | Berman | |
| 5,802,167 A | 9/1998 | Hong | |
| 5,805,676 A | 9/1998 | Martino | |
| 5,809,245 A | 9/1998 | Zenda | |
| 5,815,020 A | 9/1998 | Allen et al. | |
| 5,817,207 A | 10/1998 | Leighton | |

(56) References Cited

U.S. PATENT DOCUMENTS

| | | | |
|---|---|---|---|
| 5,818,030 A | 10/1998 | Reyes | |
| 5,825,871 A | 10/1998 | Mark | |
| 5,831,520 A | 11/1998 | Stephan | |
| 5,832,424 A | 11/1998 | Tsutsui | |
| 5,847,662 A | 12/1998 | Yokota et al. | |
| 5,847,752 A | 12/1998 | Sebestyen | |
| 5,850,077 A | 12/1998 | Tognazzini | |
| 5,854,589 A | 12/1998 | How et al. | |
| 5,859,913 A | 1/1999 | Goreta et al. | |
| 5,861,841 A | 1/1999 | Gildea et al. | |
| 5,862,491 A | 1/1999 | Nair et al. | |
| 5,864,794 A | 1/1999 | Tasaki | |
| 5,870,155 A | 2/1999 | Erlin | |
| 5,877,748 A | 3/1999 | Redlich | |
| 5,878,142 A * | 3/1999 | Caputo et al. | 713/159 |
| 5,880,769 A | 3/1999 | Nemirofsky et al. | |
| 5,881,149 A | 3/1999 | Weatherill | |
| 5,884,271 A | 3/1999 | Pitroda | |
| 5,892,418 A | 4/1999 | Onishi et al. | |
| 5,903,721 A * | 5/1999 | Sixtus | 726/2 |
| 5,905,246 A | 5/1999 | Fajkowski | |
| 5,905,865 A | 5/1999 | Palmer et al. | |
| 5,907,142 A | 5/1999 | Kelsey | |
| 5,914,980 A | 6/1999 | Yokota et al. | |
| 5,921,674 A | 7/1999 | Koczi | |
| 5,928,292 A | 7/1999 | Miller et al. | |
| 5,949,492 A | 9/1999 | Mankovitz | |
| 5,949,772 A | 9/1999 | Sugikawa et al. | |
| 5,955,961 A | 9/1999 | Wallerstein | |
| 5,963,643 A | 10/1999 | Goreta et al. | |
| 5,982,762 A | 11/1999 | Anzai et al. | |
| 5,986,562 A | 11/1999 | Nikolich | |
| 5,987,509 A | 11/1999 | Portuesi | |
| 6,005,548 A | 12/1999 | Latypov et al. | |
| 6,009,151 A | 12/1999 | Staples | |
| 6,010,074 A | 1/2000 | Kelly et al. | |
| 6,014,083 A | 1/2000 | Bauerschmidt et al. | |
| 6,016,476 A | 1/2000 | Maes et al. | |
| 6,018,641 A | 1/2000 | Tsubouchi et al. | |
| 6,019,285 A | 2/2000 | Isobe et al. | |
| 6,021,119 A | 2/2000 | Derks et al. | |
| 6,023,509 A | 2/2000 | Herbert et al. | |
| 6,023,779 A | 2/2000 | Fullam et al. | |
| 6,036,099 A | 3/2000 | Leighton | |
| 6,055,592 A | 4/2000 | Smith | |
| 6,058,373 A | 5/2000 | Blinn et al. | |
| 6,060,332 A | 5/2000 | Martin | |
| 6,068,192 A | 5/2000 | McCabe et al. | |
| 6,079,621 A | 6/2000 | Vardanyan et al. | |
| 6,081,782 A | 6/2000 | Rabin | |
| 6,089,942 A | 7/2000 | Chan | |
| 6,097,292 A | 8/2000 | Kelly et al. | |
| 6,098,106 A | 8/2000 | Philyaw et al. | |
| 6,110,000 A | 8/2000 | Ting | |
| 6,119,228 A | 9/2000 | Angelo et al. | |
| 6,122,312 A | 9/2000 | Shiro | |
| 6,125,172 A | 9/2000 | August et al. | |
| 6,125,452 A | 9/2000 | Kuriyama | |
| 6,131,042 A | 10/2000 | Lee et al. | |
| 6,144,114 A | 11/2000 | Chutorash | |
| 6,149,490 A | 11/2000 | Hampton et al. | |
| 6,163,616 A | 12/2000 | Feldman | |
| 6,176,837 B1 | 1/2001 | Foxlin | |
| 6,182,044 B1 | 1/2001 | Fong et al. | |
| 6,186,396 B1 | 2/2001 | Crandall, Jr. | |
| 6,189,096 B1 * | 2/2001 | Haverty | 713/155 |
| 6,194,993 B1 | 2/2001 | Hayashi et al. | |
| 6,195,693 B1 | 2/2001 | Berry et al. | |
| 6,202,926 B1 | 3/2001 | Ito et al. | |
| 6,211,858 B1 | 4/2001 | Moon et al. | |
| 6,222,880 B1 | 4/2001 | Eastmond et al. | |
| 6,226,677 B1 | 5/2001 | Slemmer | |
| 6,233,736 B1 | 5/2001 | Wolzien | |
| 6,236,724 B1 | 5/2001 | Labaton et al. | |
| 6,237,026 B1 | 5/2001 | Prasad et al. | |
| 6,244,260 B1 | 6/2001 | Ragoza et al. | |
| 6,248,946 B1 | 6/2001 | Dwek | |
| 6,256,298 B1 | 7/2001 | Nakajo | |
| 6,257,486 B1 | 7/2001 | Teicher et al. | |
| 6,263,218 B1 | 7/2001 | Kita | |
| 6,272,228 B1 | 8/2001 | Martin | |
| 6,278,993 B1 | 8/2001 | Kumar et al. | |
| 6,282,522 B1 | 8/2001 | Davis et al. | |
| 6,284,406 B1 | 9/2001 | Xing et al. | |
| 6,289,114 B1 | 9/2001 | Mainguet | |
| 6,292,437 B1 | 9/2001 | Beard | |
| 6,301,312 B1 | 10/2001 | Limberg | |
| 6,309,275 B1 | 10/2001 | Fong et al. | |
| 6,315,195 B1 | 11/2001 | Ramachandran | |
| 6,331,972 B1 | 12/2001 | Harris et al. | |
| 6,332,163 B1 * | 12/2001 | Bowman-Amuah | 709/231 |
| 6,345,766 B1 | 2/2002 | Taskett et al. | |
| 6,360,953 B1 | 3/2002 | Lin et al. | |
| 6,377,670 B1 | 4/2002 | Rosset et al. | |
| 6,380,844 B2 | 4/2002 | Pelekis | |
| 6,382,516 B1 | 5/2002 | King | |
| 6,385,314 B1 | 5/2002 | Furuya | |
| 6,389,055 B1 | 5/2002 | August et al. | |
| 6,389,935 B1 | 5/2002 | Azima et al. | |
| 6,392,960 B1 | 5/2002 | Seltzer et al. | |
| 6,393,126 B1 * | 5/2002 | van der Kaay et al. | 380/241 |
| 6,394,343 B1 | 5/2002 | Berg et al. | |
| 6,400,996 B1 | 6/2002 | Hoffberg et al. | |
| 6,404,877 B1 | 6/2002 | Bolduc et al. | |
| 6,421,453 B1 | 7/2002 | Kanevsky et al. | |
| 6,442,510 B1 | 8/2002 | Klefenz | |
| 6,445,780 B1 | 9/2002 | Rosset et al. | |
| 6,481,623 B1 | 11/2002 | Grant et al. | |
| 6,487,421 B2 | 11/2002 | Hess et al. | |
| 6,513,015 B2 | 1/2003 | Ogasawara | |
| 6,516,416 B2 * | 2/2003 | Gregg et al. | 726/8 |
| 6,519,564 B1 | 2/2003 | Hoffberg et al. | |
| 6,547,130 B1 | 4/2003 | Shen | |
| 6,556,768 B1 | 4/2003 | Nakajima et al. | |
| 6,556,965 B1 | 4/2003 | Borland et al. | |
| 6,559,755 B1 | 5/2003 | Hamamoto et al. | |
| 6,570,490 B1 | 5/2003 | Saitoh et al. | |
| 6,573,883 B1 | 6/2003 | Bartlett | |
| 6,594,052 B2 | 7/2003 | Hiramatsu et al. | |
| 6,607,136 B1 | 8/2003 | Atsmon et al. | |
| 6,628,240 B2 | 9/2003 | Amadeo | |
| 6,641,374 B2 | 11/2003 | Kim | |
| 6,647,063 B1 | 11/2003 | Oikawa | |
| 6,648,719 B2 | 11/2003 | Chan | |
| 6,661,563 B2 | 12/2003 | Hayashi et al. | |
| 6,681,008 B2 | 1/2004 | Bolduc et al. | |
| 6,704,715 B1 | 3/2004 | Rosset et al. | |
| 6,708,892 B2 | 3/2004 | Smith, II | |
| 6,754,641 B2 | 6/2004 | Kolls | |
| 6,758,404 B2 | 7/2004 | Ladyansky | |
| 6,760,276 B1 | 7/2004 | Karr | |
| 6,765,996 B2 | 7/2004 | Baxter et al. | |
| 6,766,946 B2 | 7/2004 | Lida et al. | |
| RE38,600 E | 9/2004 | Mankovitz | |
| 6,804,778 B1 * | 10/2004 | Levi et al. | 713/176 |
| 6,823,452 B1 * | 11/2004 | Doyle et al. | 713/156 |
| 6,834,111 B1 * | 12/2004 | Nishimura et al. | 380/255 |
| 6,853,731 B1 * | 2/2005 | Boyle et al. | 380/268 |
| 6,873,974 B1 * | 3/2005 | Schutzer | 705/41 |
| 6,934,848 B1 * | 8/2005 | King et al. | 713/182 |
| 6,963,842 B2 | 11/2005 | Goodwin | |
| 6,973,426 B1 | 12/2005 | Schier et al. | |
| 6,976,164 B1 * | 12/2005 | King et al. | 713/156 |
| 6,982,649 B2 | 1/2006 | Blum et al. | |
| 6,990,334 B1 | 1/2006 | Ito | |
| 7,013,301 B2 | 3/2006 | Holm et al. | |
| 7,058,376 B2 | 6/2006 | Logan et al. | |
| 7,072,476 B2 | 7/2006 | White et al. | |
| 7,080,253 B2 | 7/2006 | Weare | |
| 7,095,450 B1 | 8/2006 | Holmes et al. | |
| 7,103,575 B1 * | 9/2006 | Linehan | 705/64 |
| 7,159,153 B2 | 1/2007 | Kim | |
| 7,183,929 B1 | 2/2007 | Antebi et al. | |
| 7,260,221 B1 | 8/2007 | Atsmon | |

(56) References Cited

U.S. PATENT DOCUMENTS

| | | | |
|---|---|---|---|
| 7,280,970 B2 | 10/2007 | Tamir et al. | |
| 7,318,049 B2 | 1/2008 | Iannacci | |
| 7,334,735 B1 | 2/2008 | Antebi et al. | |
| 7,343,619 B2 | 3/2008 | Ofek et al. | |
| 7,379,901 B1 | 5/2008 | Philyaw | |
| 7,437,560 B1 | 10/2008 | Page et al. | |
| 7,451,114 B1 | 11/2008 | Matsuda et al. | |
| 7,493,283 B1 | 2/2009 | Philyaw | |
| 7,565,294 B2 | 7/2009 | Rhoads | |
| 7,568,963 B1 | 8/2009 | Atsmon et al. | |
| 7,643,850 B2 | 1/2010 | Thijssen et al. | |
| 7,706,838 B2 | 4/2010 | Atsmon et al. | |
| 7,716,662 B2 | 5/2010 | Seiden | |
| 7,760,919 B2 | 7/2010 | Namgoong | |
| 7,765,373 B1* | 7/2010 | Merry et al. | 711/163 |
| 7,818,423 B1 | 10/2010 | Philyaw | |
| 7,930,213 B1 | 4/2011 | Philyaw et al. | |
| 8,019,609 B2 | 9/2011 | Tamir et al. | |
| 8,078,136 B2 | 12/2011 | Atsmon et al. | |
| 8,311,516 B2 | 11/2012 | Kim et al. | |
| 8,509,680 B2 | 8/2013 | Atsmon et al. | |
| 2001/0047486 A1* | 11/2001 | Green et al. | 713/201 |
| 2001/0055202 A1 | 12/2001 | Templeton et al. | |
| 2002/0016858 A1* | 2/2002 | Sawada et al. | 709/238 |
| 2002/0019939 A1 | 2/2002 | Yamamoto et al. | |
| 2002/0040441 A1* | 4/2002 | See et al. | 713/202 |
| 2002/0097467 A1 | 7/2002 | Terahara et al. | |
| 2002/0112171 A1* | 8/2002 | Ginter et al. | 713/185 |
| 2002/0156917 A1 | 10/2002 | Nye | |
| 2002/0157034 A1 | 10/2002 | Sagar | |
| 2002/0162023 A1* | 10/2002 | Audebert et al. | 713/201 |
| 2002/0169608 A1 | 11/2002 | Tamir et al. | |
| 2002/0172193 A1 | 11/2002 | Preston et al. | |
| 2003/0006901 A1 | 1/2003 | Kim et al. | |
| 2003/0010190 A1 | 1/2003 | Sammut et al. | |
| 2003/0067908 A1 | 4/2003 | Mattaway et al. | |
| 2003/0074569 A1* | 4/2003 | Yamauchi et al. | 713/189 |
| 2003/0111527 A1 | 6/2003 | Blossom | |
| 2003/0147547 A1* | 8/2003 | Lin et al. | 382/100 |
| 2003/0159040 A1 | 8/2003 | Hashimoto et al. | |
| 2004/0031856 A1* | 2/2004 | Atsmon et al. | 235/492 |
| 2004/0053642 A1* | 3/2004 | Sandberg et al. | 455/558 |
| 2004/0069846 A1 | 4/2004 | Lambert | |
| 2004/0130442 A1 | 7/2004 | Breed et al. | |
| 2004/0220807 A9 | 11/2004 | Tamir et al. | |
| 2004/0236819 A1 | 11/2004 | Anati et al. | |
| 2004/0260556 A1 | 12/2004 | Hoffberg et al. | |
| 2005/0044561 A1 | 2/2005 | McDonald | |
| 2005/0053122 A1 | 3/2005 | Barclay | |
| 2005/0059341 A1 | 3/2005 | Damaghi | |
| 2005/0172137 A1* | 8/2005 | Hopkins | 713/185 |
| 2005/0234826 A1* | 10/2005 | Ohmori et al. | 705/51 |
| 2006/0136544 A1 | 6/2006 | Atsmon et al. | |
| 2006/0229114 A2 | 10/2006 | Kim | |
| 2006/0271646 A1 | 11/2006 | Janky et al. | |
| 2006/0279542 A1 | 12/2006 | Flack et al. | |
| 2006/0288374 A1 | 12/2006 | Ferris et al. | |
| 2007/0047846 A1 | 3/2007 | Li et al. | |
| 2007/0063025 A1 | 3/2007 | Blossom | |
| 2007/0112565 A1 | 5/2007 | Kim et al. | |
| 2007/0112566 A1 | 5/2007 | Chen | |
| 2007/0135984 A1 | 6/2007 | Breed et al. | |
| 2007/0223705 A1* | 9/2007 | Kasahara et al. | 380/281 |
| 2008/0014989 A1 | 1/2008 | Sandegard et al. | |
| 2008/0034410 A1* | 2/2008 | Udupa et al. | 726/5 |
| 2008/0071537 A1 | 3/2008 | Tamir et al. | |
| 2008/0072072 A1* | 3/2008 | Muraki et al. | 713/193 |
| 2008/0152137 A1* | 6/2008 | Nakano et al. | 380/201 |
| 2008/0167106 A1 | 7/2008 | Lutnick et al. | |
| 2008/0173717 A1 | 7/2008 | Antebi et al. | |
| 2009/0006729 A1 | 1/2009 | Piazza et al. | |
| 2009/0036188 A1 | 2/2009 | Gelman | |
| 2009/0137269 A1 | 5/2009 | Chung | |
| 2009/0175318 A1 | 7/2009 | Koenck et al. | |
| 2009/0184884 A1 | 7/2009 | Kyou et al. | |
| 2009/0204998 A1 | 8/2009 | McDaniel et al. | |
| 2009/0264205 A1 | 10/2009 | Atsmon et al. | |
| 2010/0030838 A1 | 2/2010 | Atsmon et al. | |
| 2010/0162122 A1 | 6/2010 | Mikan et al. | |
| 2010/0210264 A1 | 8/2010 | Netanel et al. | |
| 2010/0211431 A1 | 8/2010 | Lutnick et al. | |
| 2010/0223120 A1 | 9/2010 | Dragt | |
| 2010/0227590 A1 | 9/2010 | Kim et al. | |
| 2010/0256976 A1 | 10/2010 | Atsmon et al. | |
| 2011/0321149 A1 | 12/2011 | Tamir et al. | |
| 2012/0058705 A1 | 3/2012 | Atsmon et al. | |
| 2012/0151515 A1 | 6/2012 | Atsmon et al. | |
| 2013/0005447 A1 | 1/2013 | Lutnick et al. | |
| 2013/0006773 A1 | 1/2013 | Lutnick et al. | |
| 2013/0073744 A1 | 3/2013 | Ratica | |
| 2013/0080238 A1 | 3/2013 | Kelly et al. | |
| 2013/0218571 A1 | 8/2013 | Tamir et al. | |
| 2013/0244531 A1 | 9/2013 | Atsmon et al. | |
| 2013/0332355 A1 | 12/2013 | Atsmon et al. | |
| 2014/0026213 A1 | 1/2014 | Antebi et al. | |
| 2014/0154969 A1 | 6/2014 | Atsmon et al. | |
| 2014/0179432 A1 | 6/2014 | Cohen et al. | |

FOREIGN PATENT DOCUMENTS

| | | |
|---|---|---|
| EP | 0526015 | 2/1993 |
| EP | 0526015 | 3/1993 |
| EP | 0789320 | 8/1997 |
| EP | 0872995 | 10/1998 |
| EP | 0933733 | 8/1999 |
| EP | 1065634 | 1/2001 |
| FR | 2790849 | 9/2000 |
| GB | 2236258 | 3/1991 |
| GB | 2236258 | 4/1991 |
| JP | 62-060076 | 3/1987 |
| JP | 01-226091 | 8/1989 |
| JP | 01-226091 | 9/1989 |
| JP | 07-087234 | 3/1995 |
| WO | WO 93/11619 | 6/1993 |
| WO | WO 93/21720 | 10/1993 |
| WO | WO 94/17498 | 4/1994 |
| WO | WO 94/17498 | 8/1994 |
| WO | WO 96/10880 | 4/1996 |
| WO | WO 97/15899 | 1/1997 |
| WO | WO 97/16049 | 1/1997 |
| WO | WO 97/15899 | 5/1997 |
| WO | WO 97/16049 | 5/1997 |
| WO | WO 98/12670 | 3/1998 |
| WO | WO 98/57474 | 12/1998 |
| WO | WO 99/22362 | 5/1999 |
| WO | WO 99/23804 | 5/1999 |
| WO | WO 99/22362 | 6/1999 |
| WO | WO 00/01456 | 1/2000 |
| WO | WO 00/15316 | 3/2000 |
| WO | WO 00/21020 | 4/2000 |
| WO | WO 00/21203 | 4/2000 |
| WO | WO 00/29920 | 5/2000 |
| WO | WO 00/77751 | 12/2000 |
| WO | WO 01/82223 | 1/2001 |
| WO | WO 01/08110 | 2/2001 |
| WO | WO 01/82223 | 11/2001 |
| WO | WO 02/14974 | 2/2002 |
| WO | WO 02/76717 | 3/2002 |
| WO | WO 02/076717 | 10/2002 |
| WO | WO 02/078199 | 10/2002 |

OTHER PUBLICATIONS

Encotone, Ltd.—Corporate Background; 2 pages 1998; Retrieved from the Internet at <http://web.archive.org/web/19981205164055/www.encotone.com/html/comp_def.html>.

TeleIDTM System; "The Technology"; Encotone Ltd.; 8 P., Retrieved From the Internet at <http://web.archive.org/web/19981205063057/www.encotone.com/html/tech_def.html>, 1998.

International Preliminary Examination Report Dated Mar. 21, 2001 From the International Preliminary Examining Authority of the Patent Cooperation Authority Re.: Application No. PCT/IL99/00525.

(56) References Cited

OTHER PUBLICATIONS

International Search Report Dated Dec. 3, 2002 from the International Searching Authority of the Patent Cooperation Treaty Re.: Application No. PCT/IL02/00236.
International Search Report Dated Apr. 4, 2000 From the International Searching authority of the Patent Cooperation Treaty Re.: Application No. PCT/IL99/00525.
International Search Report Dated Jul. 5, 2000 From the International Searching Authority of the Patent Cooperation Treaty Re.: Application No. PCT/IB99/02110.
International Search Report Dated Dec. 9, 2002 From the International Searching Authority of the Patent Cooperation Treaty Re.: Application No. PCT/US02/90342.
International Search Report Dated Feb. 17, 2000 From the International Searching Authority of the Patent Cooperation Treaty Re.: Application No. PCT/IL99/00521.
International Search Report Dated Jul. 21, 2000 From the International Searching Authority of the Patent Cooperation Treaty Re.: Application No. PCT/IL99/00506.
International Search Report Dated Mar. 25, 1999 From the International Searching Authority of the Patent Cooperation Treaty Re.: Application No. PCT/IL98/00450.
International Search Report Dated Mar. 26, 2002 From the International Searching Authority of the Patent Cooperation Treaty Re.: Application No. PCT/IL01/00758.
International Search Report Dated Sep. 28, 2000 From the International Searching Authority of the Patent Cooperation Treaty Re.: Application No. PCT/IL99/00525.
Notice of Allowance Dated Jan. 2, 2008 from the United States Patent and Trademark Office Re.: U.S. Appl. No. 09/806,618.
Notice of Allowance Dated Jun. 4, 2007 From the United States Patent and Trademark Office Re.: U.S. Appl. No. 09/853,017.
Notice of Allowance Dated Oct. 4, 2007 from the United States Patent and Trademark Office Re.: U.S. Appl. No. 09/806,789.
Notice of Allowance Dated Aug. 5, 2008 From the United States Patent and Trademark Office Re.: U.S. Appl. No. 11/339,275.
Notice of Allowance Dated Mar. 24, 2009 From the US Patent and Trademark Office Re.: U.S. Appl. No. 09/787,265.
Notice of Allowance Dated Oct. 26, 2006 From the United States Patent and Trademark Office Re.: U.S. Appl. No. 09/743,065.
Official Action Dated Sep. 2, 2004 From the United States Patent and Trademark Office Re.: U.S. Appl. No. 09/806,789.
Official Action Dated Apr. 6, 2006 From the United States Patent and Trademark Office Re.: U.S. Appl. No. 09/806,618.
Official Action Dated Jan. 7, 2005 From the United Stated Patent and Trademark Office Re: U.S. Appl. No. 09/853,017.
Official Action Dated Oct. 7, 2004 From the United States Patent and Trademark Office Re.: U.S. Appl. No. 09/806,618.
Official Action Dated Jan. 9, 2006 From the United Stated Patent and Trademark Office Re: U.S. Appl. No. 09/853,017.
Official Action Dated Feb. 11, 2008 From the United States Patent and Trademark Office Re.: U.S. Appl. No. 09/787,265.
Official Action Dated Aug. 12, 2004 From the United States Patent and Trademark Office Re.: U.S. Appl. No. 09/831,935.
Official Action Dated Jun. 13, 2007 From the United States Patent and Trademark Office Re.: U.S. Appl. No. 11/339,275.
Official Action Dated Nov. 14, 2006 From the United States Patent and Trademark Office Re.: U.S. Appl. No. 09/806,789.
Official Action Dated Dec. 17, 2003 From the United States Patent and Trademark Office Re.: U.S. Appl. No. 09/853,017.
Official Action Dated May 17, 2005 From the United States Patent and Trademark Office Re.: U.S. Appl. No. 09/831,935.
Official Action Dated Jan. 18, 2008 From the United States Patent and Trademark Office Re.: U.S. Appl. No. 10/618,962.
Official Action Dated Mar. 18, 2009 From the US Patent and Trademark Office Re.: U.S. Appl. No. 10/618,962.
Official Action Dated Jun. 19, 2007 From the United States Patent and Trademark Office Re.: U.S. Appl. No. 09/806,789.
Official Action Dated Mar. 19, 2008 From the United States Patent and Trademark Office Re.: U.S. Appl. No. 10/668,109.
Official Action Dated Feb. 21, 2008 From the United States Patent and Trademark Office Re.: U.S. Appl. No. 11/339,275.
Official Action Dated May 21, 2007 From the United States Patent and Trademark Office Re.: U.S. Appl. No. 09/806,618.
Official Action Dated Oct. 23, 2003 From the United States Patent and Trademark Office Re.: U.S. Appl. No. 09/787,265.
Official Action Dated Jan. 25, 2003 From the United States Patent and Trademark Office Re.: U.S. Appl. No. 09/787,265.
Official Action Dated May 25, 2005 From the United States Patent and Trademark Office Re.: U.S. Appl. No. 09/806,789.
Official Action Dated Sep. 25, 2006 From the United States Patent and Trademark Office Re.: U.S. Appl. No. 09/787,265.
Official Action Dated Sep. 25, 2006 From the United States Patent and Trademark Office Re.: U.S. Appl. No. 11/339,275.
Official Action Dated Jan. 26, 2006 From the United States Patent and Trademark Office Re.: U.S. Appl. No. 09/831,935.
Official Action Dated Jun. 29, 2007 From the US Patent and Trademark Office Re.: U.S. Appl. No. 09/787,265.
Official Action Dated Oct. 29, 2008 From the US Patent and Trademark Office Re.: U.S. Appl. No. 09/787,265.
Official Action Dated Aug. 30, 2006 From the United States Patent and Trademark Office Re.: U.S. Appl. No. 09/853,017.
Supplemental Notice of Allowability Dated Dec. 16, 2008 From the US Patent and Trademark Office Re.: U.S. Appl. No. 11/339,275.
Written Opinion Dated Aug. 16, 2000 From the International Preliminary Examining Authority of the Patent Cooperation Treaty re.: Application No. PCT/IL99/00525.
Response Dated Jul. 12, 2010 to Official Action of Mar. 10, 2010 From the US Patent and Trademark Office Re.: U.S. Appl. No. 11/902,009.
Ahuja et al. "An Analog Front End for a Two-Chip 2400-Bit/s Voice-Band Modem", Intel Corporation, IEEE Journal of Solid-State Circuits, 22(6): 996-1003, 1987. Abstract.
Communication Pursuant to Article 94(3) EPC Dated Aug. 18, 2010 From the European Patent Office Re. Application No. 01908897.0.
Notice of Allowance Dated Nov. 24, 2010 From the US Patent and Trademark Office Re.: U.S. Appl. No. 12/272,828.
Official Action Dated Nov. 10, 2010 From the US Patent and Trademark Office Re.: U.S. Appl. No. 12/496,669.
Response Dated Nov. 8, 2010 to Official Action of Aug. 6, 2010 From the US Patent and Trademark Office Re.: U.S. Appl. No. 12/079,000.
Response Dated Dec. 9, 2010 to Official Action of Nov. 10, 2010 From the US Patent and Trademark Office Re.: U.S. Appl. No. 12/496,669.
Response Dated Dec. 21, 2010 to Official Action Dated Aug. 6, 2010 From the US Patent and Trademark Office Re.: U.S. Appl. No. 12/079,000.
Response Dated Dec. 22, 2010 to Communication Pursuant to Article 94(3) EPC of Aug. 18, 2010 From the European Patent Office Re. Application No. 01908897.0.
Response Dated Nov. 22, 2010 to Official Action of Jul. 22, 2010 From the US Patent and Trademark Office Re.: U.S. Appl. No. 12/007,441.
Official Action Dated Apr. 12, 2012 From the US Patent and Trademark Office Re.: U.S. Appl. No. 12/079,000.
Official Action Dated Nov. 15, 2011 From the US Patent and Trademark Office Re.: U.S. Appl. No. 12/007,441.
Communication Pursuant to Article 94(3) EPC Dated Mar. 25, 2011 From the European Patent Office Re. Application No. 02718485.2.
Response Dated Jun. 9, 2011 to Official Action of Feb. 10, 2011 From the US Patent and Trademark Office Re.: U.S. Appl. No. 12/007,441.
Notice of Allowance Dated Jul. 20, 2011 From the US Patent and Trademark Office Re.: U.S. Appl. No. 12/496,669.
Response Dated Jun. 6, 2011 to Official Action of Mar. 7, 2011 From the US Patent and Trademark Office Re.: U.S. Appl. No. 12/079,000.
Response Dated Jul. 25, 2011 to Communication Pursuant to Article 94(3) EPC of Mar. 25, 2011 From the European Patent Office Re. Application No. 02718485.2.
Official Action Dated Feb. 10, 2011 From the US Patent and Trademark Office Re.: U.S. Appl. No. 12/007,441.
Official Action Dated Mar. 7, 2011 From the US Patent and Trademark Office Re.: U.S. Appl. No. 12/079,000.

(56) References Cited

OTHER PUBLICATIONS

Official Action Dated Feb. 17, 2011 From the US Patent and Trademark Office Re.: U.S. Appl. No. 12/496,669.
Notice of Allowance Dated May 12, 2011 From the US Patent and Trademark Office Re.: U.S. Appl. No. 11/902,009.
Response Dated May 17, 2011 to Official Action of Feb. 17, 2011 From the US Patent and Trademark Office Re.: U.S. Appl. No. 12/496,669.
Official Action Dated Sep. 15, 2011 From the US Patent and Trademark Office Re.: U.S. Appl. No. 12/007,441.
Restriction Official Action Dated Jan. 25, 2012 From the US Patent and Trademark Office Re. U.S. Appl. No. 13/229,784.
Notice of Allowance Dated Aug. 9, 2011 From the US Patent and Trademark Office Re.: U.S. Appl. No. 12/496,669.
Supplemental Notice of Allowability Dated Aug. 18, 2011 From the US Patent and Trademark Office Re.: U.S. Appl. No. 12/496,669.
Official Action Dated Oct. 19, 2011 From the US Patent and Trademark Office Re.: U.S. Appl. No. 12/079,000.
Response Dated Oct. 10, 2011 to Official Action of Sep. 15, 2011 From the US Patent and Trademark Office Re.: U.S. Appl. No. 12/007,441.
Official Action Dated Mar. 20, 2012 From the US Patent and Trademark Office Re. U.S. Appl. No. 13/229,784.
Official Action Dated Aug. 23, 2012 From the US Patent and Trademark Office Re.: U.S. Appl. No. 12/079,000.
Official Action Dated Sep. 6, 2012 From the US Patent and Trademark Office Re. U.S. Appl. No. 13/295,119.
Official Action Dated Jun. 18, 2012 From the US Patent and Trademark Office Re.: U.S. Appl. No. 12/007,441.
Notice of Panel Decision From Pre-Appeal Brief Review Dated Aug. 17, 2012 From the US Patent and Trademark Office Re.: U.S. Appl. No. 12/079,000.
Official Action Dated Aug. 3, 2012 From the US Patent and Trademark Office Re. U.S. Appl. No. 13/229,784.
Official Action Dated Apr. 2, 2010 From the US Patent and Trademark Office Re.: U.S. Appl. No. 12/272,828.
Notice of Allowance Dated Apr. 5, 2013 From the US Patent and Trademark Office Re. U.S. Appl. No. 13/316,710.
Official Action Dated Apr. 10, 2013 From the US Patent and Trademark Office Re. U.S. Appl. No. 12/903,240.
Communication Pursuant to Article 94(3) EPC Dated Jan. 2, 2013 From the European Patent Office Re. Application No. 01908897.0.
Official Action Dated Jan. 10, 2013 From the US Patent and Trademark Office Re.: U.S. Appl. No. 12/007,441.
Official Action Dated Jan. 17, 2013 From the US Patent and Trademark Office Re.: U.S. Appl. No. 12/079,000.
Communications Pursuant to Rules 70(2) and 70a(2) EPC and Reference to Rule 39(1) EPC Dated Dec. 10, 2012 From the European Patent Office Re. Application No. 12181255.6.
European Search Report and the European Search Opinion Dated Nov. 5, 2012 From the European Patent Office Re. Application No. 12181255.6.
Notice of Allowance Dated Nov. 8, 2012 From the US Patent and Trademark Office Re. U.S. Appl. No. 13/229,784.
Notice of Allowance Dated Dec. 21, 2012 From the US Patent and Trademark Office Re. U.S. Appl. No. 13/295,119.
Restriction Official Action Dated Dec. 5, 2012 From the US Patent and Trademark Office Re. U.S. Appl. No. 12/903,240.
International Preliminary Examination Report Dated Dec. 4, 2003 From the International Preliminary Examining Authority of the Patent Cooperation Authority Re.: Application No. PCT/IL01/00758.
Notice of Allowance Dated Aug. 9, 2011 From the US Patent and Trademark Office Re.: U.S. Appl. No. 12/752,181.
Official Action Dated Jun. 2, 2005 From the United States Patent and Trademark Office Re.: U.S. Appl. No. 09/853,017.
Official Action Dated Aug. 4, 2008 From the United States Patent and Trademark Office Re.: U.S. Appl. No. 10/618,962.
Supplemental Notice of Allowability Dated Aug. 18, 2011 From the US Patent and Trademark Office Re.: U.S. Appl. No. 12/752,181.
Encotone "The Technology", TeleIDTM System, Encotone Ltd., 8 P., Retrieved From the Internet, 1998.
Encotone Encotone, Ltd.—Corporate Background, 2 P., Retrieved From the Internet, 1998.
Invitation Pursuant to Article 94(3) and Rule 71(1) EPC Dated May 24, 2013 From the European Patent Office Re. Application No. 02718485.2.
Official Action Dated Aug. 12, 2013 From the US Patent and Trademark Office Re. U.S. Appl. No. 12/079,000.
Communication Pursuant to Article 94(3) EPC Dated Oct. 15, 2013 From the European Patent Office Re. Application No. 12181255.6.
Communication Pursuant to Article 94(3) EPC Dated Sep. 26, 2013 From the European Patent Office Re. Application No. 02707082.0.
Notice of Allowance Dated Oct. 17, 2013 From the US Patent and Trademark Office Re. U.S. Appl. No. 12/903,240.
Official Action Dated Oct. 8, 2013 From the US Patent and Trademark Office Re. U.S. Appl. No. 13/964,208.
Notice of Allowance Dated May 23, 2013 From the US Patent and Trademark Office Re. U.S. Appl. No. 12/007,441.
Applicant-Initiated Interview Summary Dated May 22, 2013 From the US Patent and Trademark Office Re. U.S. Appl. No. 12/079,000.
Official Action Dated Jun. 5, 2013 From the US Patent and Trademark Office Re. U.S. Appl. No. 13/083,643.
Proceedings Further With the European Patent Application Pursuant to Rule 70(2) EPC Dated Jun. 11, 2013 From the European Patent Office Re. Application No. 02707082.0.
Supplementary European Search Report Dated May 24, 2013 From the European Patent Office Re. Application No. 02707082.0.
Advisory Action Before Filing of an Appeal Brief Dated Jul. 9, 2013 From the US Patent and Trademark Office Re.: U.S. Appl. No. 12/079,000.
Summons to Attend Oral Proceedings Pursuant to Rule 115(1) EPC Dated Nov. 21, 2013 From the European Patent Office Re. Application No. 02718485.2.
Notice of Allowance Dated May 7, 2014 From the US Patent and Trademark Office Re. U.S. Appl. No. 14/176,278.
Supplemental Notice of Allowability Dated Jul. 16, 2014 From the US Patent and Trademark Office Re. U.S. Appl. No. 14/176,278.
Official Action Dated Feb. 4, 2014 From the US Patent and Trademark Office Re. U.S. Appl. No. 13/964,208.
Official Action Dated Dec. 17, 2013 From the US Patent and Trademark Office Re. U.S. Appl. No. 13/083,643.
Official Action Dated Dec. 27, 2013 From the US Patent and Trademark Office Re. U.S. Appl. No. 12/079,000.
Restriction Official Action Dated Dec. 18, 2013 From the US Patent and Trademark Office Re. U.S. Appl. No. 14/033,579.
Official Action Dated Jul. 31, 2014 From the US Patent and Trademark Office Re. U.S. Appl. No. 12/079,000.
Advisory Action Before the Filing of an Appeal Brief Dated Jun. 23, 2014 From the US Patent and Trademark Office Re. U.S. Appl. No. 13/083,643.
Applicant-Initiated Interview Summary Dated Jun. 12, 2014 From the US Patent and Trademark Office Re. U.S. Appl. No. 12/079,000.
Official Action Dated Jun. 20, 2014 From the US Patent and Trademark Office Re. U.S. Appl. No. 14/033,579. (Part I).
Official Action Dated Jun. 20, 2014 From the US Patent and Trademark Office Re. U.S. Appl. No. 14/033,579. (Part II).
Summons to Attend Oral Proceedings Pursuant to Rule 115(1) EPC Dated Jul. 23, 2014 From the European Patent Office Re. Application No. 02707082.0.
Final Official Action Dated Mar. 5, 2014 From the US Patent and Trademark Office Re. U.S. Appl. No. 13/083,643.
Official Action Dated Mar. 18, 2014 From the US Patent and Trademark Office Re. U.S. Appl. No. 13/867,173.
Official Action Dated May 2, 2014 From the US Patent and Trademark Office Re. U.S. Appl. No. 12/903,240.
Encotone "The Technology", TeleIDTM System, Encotone Ltd., 8 P., Retrieved From the Internet: <http://web.archive.org/web/19981205063057/www.encotone.com/html/tech_def.html>, 1998.
Encotone Encotone, Ltd.—Corporate Background, 2 P., 1998. Retrieved From the Internet: <http://web.archive.org/web/19981205164055/www.encotone.com/html/comp_def.html>.

(56) References Cited

OTHER PUBLICATIONS

Notice of Allowance Dated Jun. 7, 2005 From the United States Patent and Trademark Office re.: U.S. Appl. No. 09/806,618.
Notice of Allowance Dated Dec. 11, 2009 From the US Patent and Trademark Office Re.: U.S. Appl. No. 10/618,962.
Official Action Dated Feb. 3, 2010 From the US Patent and Trademark Office Re.: U.S. Appl. No. 12/007,441.
Official Action Dated Jun. 4, 2007 From the United States Patent and Trademark Office Re.: U.S. Appl. No. 10/618,962.
Official Action Dated Mar. 10, 2010 From the US Patent and Trademark Office Re.: U.S. Appl. No. 11/902,009.
Official Action Dated Jan. 15, 2010 From the US Patent and Trademark Office Re.: U.S. Appl. No. 11/902,009.
Official Action Dated Aug. 20, 2009 From the US Patent and Trademark Office Re.: U.S. Appl. No. 12/272,828.
Official Action Dated Jul. 22, 2009 From the US Patent and Trademark Office Re.: U.S. Appl. No. 12/007,441.
Response Dated Feb. 2, 2010 to Official Action of Jan. 15, 2010 From the US Patent and Trademark Office Re.: U.S. Appl. No. 11/902,009.
Response Dated Dec. 22, 2009 to Official Action of Aug. 20, 2009 From the US Patent and Trademark Office Re.: U.S. Appl. No. 12/272,828.
Response Dated Mar. 31, 2010 to Official Action of Feb. 3, 2010 From the US Patent and Trademark Office Re.: U.S. Appl. No. 12/007,441.
Suppl. IDS II Done: Jul. 28, 2008. Considered: Jan. 13, 2010.
Supplementary European Search Report Dated Feb. 24, 2010 From the European Patent Office Re.: Application No. 01908897.0.
Official Action Dated Jul. 22, 2010 From the US Patent and Trademark Office Re.: U.S. Appl. No. 12/007,441.
Response Dated Jul. 27, 2010 to Official Action of Apr. 2, 2010 Prom the US Patent and Trademark Office Re.: U.S. Appl. No. 12/272,828.
Official Action Dated Aug. 6, 2010 From the US Patent and Trademark Office Re.: U.S. Appl. No. 12/079,000.
Notice of Allowance Dated Aug. 16, 2010 From the US Patent and Trademark Office Re.: U.S. Appl. No. 11/902,009.
Communication Pursuant to Article 94(3) EPC Dated Jan. 20, 2012 From the European Patent Office Re. Application No. 02718485.2.

* cited by examiner

METHOD AND SYSTEM FOR REMOTELY AUTHENTICATING IDENTIFICATION DEVICES

RELATED APPLICATIONS

The present application is a continuation application of PCT Application No. PCT/IL02/00236, filed on 22 Mar. 2002, published as WO 02/078199. The present application is also a continuation-in-part of PCT Application No. PCT/IL01/00758, filed on 14 Aug. 2001, published as WO 02/14974, and U.S. application Ser. No. 09/853,017, filed on 10 May 2001, and claims the benefit under §119(e) of U.S. Provisional Application No. 60/278,065, filed on 22 Mar. 2001, U.S. Provisional Application No. 60/278,010, filed on 22 Mar. 2001 and U.S. Provisional Application No. 60/277,996, filed on 22 Mar. 2001. All the disclosures of the above listed applications are incorporated herein by reference.

FIELD OF THE INVENTION

The present invention relates to authentication methods. In one aspect thereof, the invention relates to a method and system for authenticating an identification devices, such as a self-powered card (hereinafter referred to as SPC).

BACKGROUND OF THE INVENTION

In order to facilitate the reading of the description to follow, a number of terms and acronyms, which are well known in the art are defined below. These definitions are not to be taken as limiting and are provided as examples for facilitation of understanding of the disclosure. A complete and exact definition may be found in various books and other publications in the relevant fields.

Authentication is the process of verifying an object or message to ensure that the object or message are what they purport to be and/or were not tampered with. For example, authenticating an e-mail message can check that it was signed using a method that can only be performed by the supposed sender.

Encryption is the conversion of data into a form that cannot be easily understood by unauthorized people. Decryption is the process of converting encrypted data back into a form, in which it can be (at least partly) understood. Un-encrypted data is usually called Plain-text while encrypted data is referred to as Cipher-text. In some encryption methods, the encryption and decryption are subject to a Key, used for conversion between one form and the other.

Cryptography is the art of protecting information by encrypting it into an unreadable format (i.e. cipher-text). In some implementations, only those who possess a secret key can decrypt the message into plain text.

As the Internet and other forms of electronic communication become more prevalent, electronic security is becoming increasingly important Cryptography is therefore used to protect data such as e-mail messages, credit card information, and so forth.

Symmetric-key cryptography is an encryption method in which the sender and receiver of a message share a single, common key, which is used to encrypt and decrypt the message. Symmetric-key systems are simpler and faster, but their main drawback is that the two parties must somehow exchange the key in a secure way. Also, the receiver can pretend (to third parties) to be the sender, using the key. The most popular symmetric-key system is the DES (Data Encryption Standard), also described below.

Asymmetric-key cryptography is a cryptographic system that uses two keys—one key for encryption and another key for decryption.

Public-key cryptography is an asymmetric-key cryptography. According to this method, one key is known to a plurality of persons (and hence called Public-key), while the other key is known only to one person (and hence called Private-key).

An important feature of the public key system is that the public and private keys are related in such a way that once the public-key is used to encrypt a message, only the corresponding private key can be used to decrypt it. Theoretically, it is impossible to deduce the private-key from the corresponding public-key.

According to one implementation, when a sender wants to send a secure message to a recipient, he uses the recipient's public-key to encrypt the message, and the recipient uses his corresponding private-key to decrypt it. That way, the recipient of a data can be sure that the data comes from a purported sender (if the key was not stolen . . . ), and the sender can be sure that the data reaches the right destination.

Pseudo-random numbers are numbers having properties similar to those of random numbers, for example, certain distribution properties and lack of (easily discernible) relationship between consecutive numbers. True, unbiased, random numbers are difficult if not impossible to generate. Pseudo-random numbers can be generated using computing machinery means, software and hardware. These means are usually called "Random-number generators", or RNG. Both linear and non-linear RNGs are known, with linear RNGs having a greater predictability problem.

DES (Data Encryption Standard) is a NIST-standard secret key cryptography method that uses a 56-bit key. DES is based on an IBM algorithm that was further developed by the U.S. National Security Agency. It uses the block cipher method, which breaks the text into 64-bit blocks before encrypting them. There are several DES encryption modes. The most popular mode exclusive ORs each plain text block with the previous encrypted block.

DES3 (also called Triple DES) is an enhancement to DES that provides more security than standard DES, which uses only one 56-bit key. DES3 may be also be used for generating random numbers.

A Hash function is a transformation that converts a number (or other data representation) from a large space to a (typically) smaller space, typically with an even distribution. In a typical implementation, a hash function is used to convert a large string of fixed or varying length into a short value of a fixed size, which is called the Hash value of the string. One property of many Hash functions is that they are truly unreversible in that the original number cannot be reconstructed from the Hash value. This can be useful for protecting against untrustworthy employees. Merely encrypting the data may not be enough if the employee can steal the keys for decryption. It is often desirable that the computational effort be relatively moderate. Providing an even distribution may be useful in reducing the number of collisions (e.g., different inputs with same has value. Examples of well-known Hash functions are MD2 and MD5.

E-wallet is a recent effort to provide the electronic equivalent of a wallet (or better than equivalent) for e-commerce transactions and/or for physical transactions. Many implementations are known. One implementation is that a digital wallet (e-wallet) holds digital money that is purchased similar to travelers-checks, a prepaid account, or it can contain credit card information. The wallet may reside, for example, in a user's machine (including an electronic device/card) or on the servers of a Web payment service. When stored in a user's machine, the wallet may use a digital certificate for identifying a cardholder.

SSL (Secure Sockets Layer) is a commonly used protocol for managing the security of a message transmission on the Internet. SSL uses a program layer located between the Internet's Hypertext Transfer Protocol (HTTP) and Transport Control Protocol (TCP) layers. SSL is included as part of both the Microsoft and Netscape browsers and many Web server products. The "sockets" part of the term refers to the sockets method of passing data back and forth between a client and a server program in a network or between program layers in the same computer. SSL uses the public-and-private key encryption system provided by RSA, which also includes the use of a digital certificate.

CRC (Cyclic redundancy checking) is a method of checking for errors in data that has been transmitted on a communications link. A sending device applies a 16- or 32-bit polynomial to a block of data that is to be transmitted and appends the resulting cyclic redundancy code (CRC) to the block. A receiver applies the same polynomial to the data and compares its resulting CRC with the result appended by the sender. If they agree, the data has probably been received successfully. If not, the sender can be notified to resend the block of data.

One Time Code is a method by which whenever an authentication trial is initiated, a unique code, single use (or possibly small number of uses), is provided for authentication.

BACKGROUND

The Internet, and the World Wide Web (WWW) in particular, has grown in popularity in recent years. In addition to news and information, merchants and consumers alike have come to view the web as a virtually unlimited range for conducting business, in the form of sales of products, services, and information. Nevertheless, many computer users are still somewhat leery of conducting sales transactions over the Web especially because credit cards are involved, along with the associated fear of widespread and unchecked dissemination of the credit card numbers. These same users may also be leery of conducting non-Internet related sales transactions using credit cards. One worry is that After all, anyone can steal a credit card number and use it later for unauthorized purchases.

There are many applications where authentication may be useful, for example, opening a door to a secured location, buying commodities, entrance (and staying in) a secret facility, e-commerce, and logging in to a system. Sometimes presenting an identification card, such as credit or social security, is adequate for authenticating a person, and sometimes the authentication requirements are so high that the authentication process requires biometric analysis.

Currently, credit cards are used for authentication. They comprise a magnetic stripe that comprises the ID of the owner of the credit card and some additional details. Of course a conventional credit card provides relatively poor authentication, since its magnetic strip can be copied and an associated secret password (e.g., PIN) stolen rather easily. Today, in order to overcome this drawback, merchants usually verify the identity of the credit card holder with another identification means; e.g. an identification card or driving license. However, in remote authentication, such as purchasing commodities through the Internet or telephonic means, the merchant has no contact with the credit card or the cardholder itself.

There are two principal techniques currently used to handle a transaction where a credit card is involved. The first one is used for transactions of a "card present transaction" type, and the other is used for transactions of a "non-present card transaction" type. According to the first technique, three key elements exist in the transaction. The first one is called "something you have"; namely the credit card. The second one is "something you know"; namely a password and the third element is "having a witness"; namely the merchant's presence. These elements exist whenever a buyer is actually where the transaction is about to take place; e.g. in a shop. In this case the card's details are compared with the card's details contained in the card's issuer database. Verifying the cardholder is carried out by comparing his signature to the one on the card and/or using some sort of identifying card; e.g. a driving license. Since the card issuer confirms the card details and the transaction itself, the card issuer bears the consequences in case of a fraud. However, in case of telephonic or Internet transactions, none of the above-mentioned elements exist and the merchant bears responsibility in case of a fraud. Solving the problem of "non-present card" transactions greatly reduces the risk taken by merchants and makes them more amenable to such transactions.

Conventional business models, according to which credit card companies operate, pose a basic problem. The problem arises from the fact, that in a case of a "non-present card" transaction, there are generally two unsecured and parallel channels, which contribute to the risk of fraud. The first channel relates is the transaction channel itself. Whenever a cardholder wishes to carry out a transaction, he is asked by the merchant to give him details regarding the card and also his ID number. The merchant forwards these details to the card issuer (usually by phone) and upon approval of the transaction by the card issuer, the transaction is given a special code. The second channel is the authentication phase of the card by conventional methods, such as giving a password to the card issuer or by using a conventional electronic device. The problem in such cases is that the card issuer can not be sure that the specific code given to the transaction relates to the corresponding authenticated card.

Currently, each merchant is likely to have a unique digital signature, and therefore it is relatively easy to secure the merchant side/domain. Additionally there are several solutions provided by several companies, such as CYOTA and ORBISCOM, according to which whenever a potential buyer wishes to make a transaction, a one-time credit card number is created by the merchant/seller. This kind of solution apparently reduces the risk of stealing a credit card number. However, this is only a partial solution since this 'one-time' number is created and forwarded from the merchant to the card issuer, and the card issuer has to trust the merchant.

A recent development in this field is the "Smart card". A smart card includes a built-in microprocessor and memory used for identification and/or financial transactions. A smart card is currently used in conjunction with a special electronic reading device. When such a card is inserted into a reader, it transfers data to and, and receives from, a central computer. It is more secure than a conventional magnetic strip card and can be programmed to lock if the wrong password is entered too many times.

Generally, a conventional authentication system that involves a smart card comprises the following elements:

A card (may be called also "authentication token"), which comprises at least the ID of the card and a secret code, which is usually unique for each card; and An authentication server, which comprises the details of each of the cards, their owner and their secret code.

The authentication process in this case is carried out as follows:

Reading at least the ID of the card and the secret code from the smart card through an input device;

Transmitting the read data to the authentication server;

At the authentication server, comparing the read secret code with the one stored in the authentication at the ID's record, in order to find a match between the read secret code and the stored one; and Sending a transmission with the result of the authentication to the initiator of the authentication.

The above mentioned conventional authentication scheme has some drawbacks:

Fraud of the card. Since the card is a digital/electronic device, it is vulnerable to fraud;

Fraud of the transmissions, especially when the transmissions are carried out via the Internet; and Fraud of the details of the cards at the authentication center, especially by an in-house factor (such as an employee).

One of the methods to increase the security level of conventional authentication schemes based on smart cards is the "one-time code". The one-time code mechanism usually generates pseudo-random numbers, which from an outsider point of view, are random numbers. However, in some conventional systems the numbers can be predicted and abusively utilized, since the smart card and the authentication servers use the same numbers' generator.

SUMMARY OF THE INVENTION

An aspect of some embodiments of the invention relates to controlling an authentication process, for example, so as to protect a card merchant and/or a card user from fraud. In an exemplary embodiment of the invention, the protection comprises encrypting transmissions to a remote authentication server, for example to prevent tampering. Optionally, the encryption comprises signing with merchant related information, for example, so the authentication process can be reliably linked to both a card and a merchant. Alternatively or additionally, the encryption comprises signing the transmission at the user, for example to include user related and merchant page related information or a timestamp. Optionally, the merchant signature is provided by the authentication server or an associated entity.

In an exemplary embodiment of the invention, the encryption is provided by software embedded or otherwise linked to a WWW page used by the user to access the merchant. Optionally, the embedded software will work only if the merchant is online and responding correctly.

Alternatively or additionally, the merchant sends a one time code to the user, for each session and expects the code, hash thereof and/or a signed form thereof to be returned by the user. Thus, the user can be verified by the merchant. The code may be provided, for example using the embedded software.

Alternatively or additionally, protection is provided by generating codes for an authentication card and then destroying initial numbers used to generate the codes. Alternatively or additionally, the codes used by a card are pre-set at the time a card is manufactured and no new codes are generated nor is there a way to generate them once the initial numbers are destroyed.

Alternatively or additionally, protection is provided by the authentication server generating a simple authentication answer, without a reason.

Alternatively or additionally, the history of authentication of a particular card is used to assist authentication. For example, a more restrictive authentication method is used for initial authentication, but if a consecutive authentication attempt is made with similar parameters (e.g., but with a counter that is increased by one or a small number), it may succeed. Alternatively or additionally, the number of codes skipped between authentication attempts is used as an indication of the validity of an attempt.

In an exemplary embodiment of the invention, various decisions may be made according to the results of the Authentication process, for example, if to freeze a card, allow a second attempt, warn a merchant and/or freeze a merchant (e.g., if many authentication errors come with a same merchant designation).

An aspect of some embodiments of the invention relates to a method of signal detection for acoustic signals. In an exemplary embodiment of the invention, the method employs a tradeoff which allows less processing to be used, while allowing some types of errors. In an exemplary embodiment of the invention, the method comprises correlating Hilbert transforms of expected FSK frequencies, rather than correlating the frequencies themselves. This may allow various delays in an input signal to be correct for.

In an exemplary embodiment of the invention, a sinusoidal signal is represented as an analytic signal using a Hilbert transform. It is then correlated with itself and integrated over an interval. The total power and/or other property of this integral is indicative of whether a signal is present or noise.

There is thus provided in accordance with an exemplary embodiment of the invention, a method of authenticating, using an authentication server, the use of an authentication device over a communication network via an intermediate communication device, comprising:

receiving an authentication datagram by said intermediate device;

protecting said datagram by said intermediate device, by at least one of changing, adding to, encrypting and signing of said datagram; and forwarding said datagram to said authentication server for authentication. Optionally, said intermediate device comprises a vendor WWW site. Optionally, protecting comprises adding a signature associated with said vendor to said datagram. Optionally, protecting comprises encrypting said datagram.

In an exemplary embodiment of the invention, said intermediate device comprises a user computing device. Optionally, said computing device adds a time stamp to said datagram. Optionally, said computing device adds a vendor-associated information item to said datagram.

In an exemplary embodiment of the invention, said computing device encrypts said datagram. Optionally, said encryption uses a one time code. Alternatively or additionally, said one time code is provided by a vendor for a particular session with said user.

In an exemplary embodiment of the invention, said user computing device uses an embedded software component for said protecting. Optionally, said embedded software comprises an ActiveX component. Alternatively or additionally, said component is cached on said user device. Alternatively or additionally, said component requires a property value provided by a vendor to operate.

In an exemplary embodiment of the invention, communication between said intermediate device and said server uses a secure connection.

Alternatively or additionally, different communication paths are used for said authentication and for transaction details from said user. Alternatively or additionally, different communication paths are used for said authentication and for transaction details from a vendor to said authentication server.

There is also provided in accordance with an exemplary embodiment of the invention, a method of authentication of an authentication datagram by a remote authentication server, comprising:

sending an encrypted datagram by secure computer communication from a vendor software to said remote authenticator;

comparing said datagram or a hash thereof to a hash table at said server, and generating a binary validation answer by said server without an associated explanation.

There is also provided in accordance with an exemplary embodiment of the invention, a method of authentication of an authentication datagram by a remote authentication server, comprising:

sending an encrypted datagram by computer communication from an authentication device to said remote authentication server, searching, at said server, for a hash value matching said datagram or a hash thereof; and generating a validation answer by said remote authentication server, responsive to said search, wherein, said datagram includes a secret code and wherein said secret code exists only on said authentication device. Optionally, said authentication device includes a plurality of secret codes that are generated to appear unrelated.

There is also provided in accordance with an exemplary embodiment of the invention, a method of generating a code set for an authentication device, comprising:

providing a code generating software;

providing at least one seed code for said software;

generating said code set using said software and said seed;

destroying said seed immediately after generating said code set; and storing said code set or an indication thereof on an authentication device. Optionally, the method comprises generating hash values for said code set. Optionally, the method comprises generating a second set of hash values for said code set, using a different hash function for said second set.

There is also provided in accordance with an exemplary embodiment of the invention, a method of communication between a vendor and a user using an authentication device, comprising:

generating a one time code for the user for a session;

receiving an authentication datagram from said user; and passing on said datagram for verification by a remote authentication server if at least an indication of said one time code that matches said user is provided with said datagram. Optionally, the method comprises signing said datagram using said one time code by said user.

There is also provided in accordance with an exemplary embodiment of the invention, a method of remote validation, comprising:

receiving an authentication datagram by an authentication server from a remote authentication device;

matching said datagram or a hash of said datagram to a table;

calculating a counter value from a matching position in said table; and validating said authentication datagram based on an increase in said counter over a previous counter being within a certain limit. Optionally, the method comprises:

failing said authentication based on said increase being too large; and allowing a subsequent authentication based on a further increase of said subsequent validation being below a second threshold Optionally, said thresholds are the same. Alternatively, said second threshold is smaller than said certain threshold.

In an exemplary embodiment of the invention, said counter comprises an ordinal position in said table that is not apparently related to a series of generated random numbers.

There is also provided in accordance with an exemplary embodiment of the invention, a method of detecting a transmission of an acoustic multitone FSK signal, comprising:

receiving an acoustic signal;

converting the signal into a Hilbert-transform representation of the signal correlating said converted signal with at least one reference signal representing at least one expected frequency in said FSK signal;

integrating said correlation over an interval; and determining if a signal is present, based on a thresholding of a result of said integrating. Optionally, the method comprises further determining if a detected signal has a frequency within a certain frequency range. Alternatively or additionally, the method comprises further determining if a detected signal has a signal to noise ratio within a certain signal to noise ratio range.

In an exemplary embodiment of the invention, the method comprises resampling said signal after said determining.

In an exemplary embodiment of the invention, said threshold is noise dependent of the received signal.

In an exemplary embodiment of the invention, the method comprises calculating said interval based on a hardware characteristic of a producer of said acoustic signal.

BRIEF DESCRIPTION OF THE DRAWINGS

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements or parts which appear in more than one figure are preferably labeled with a same or similar number in all the figures in which they appear, in which.

DETAILED DESCRIPTION OF EXEMPLARY EMBODIMENTS

Exemplary Implementation

Figure 1:
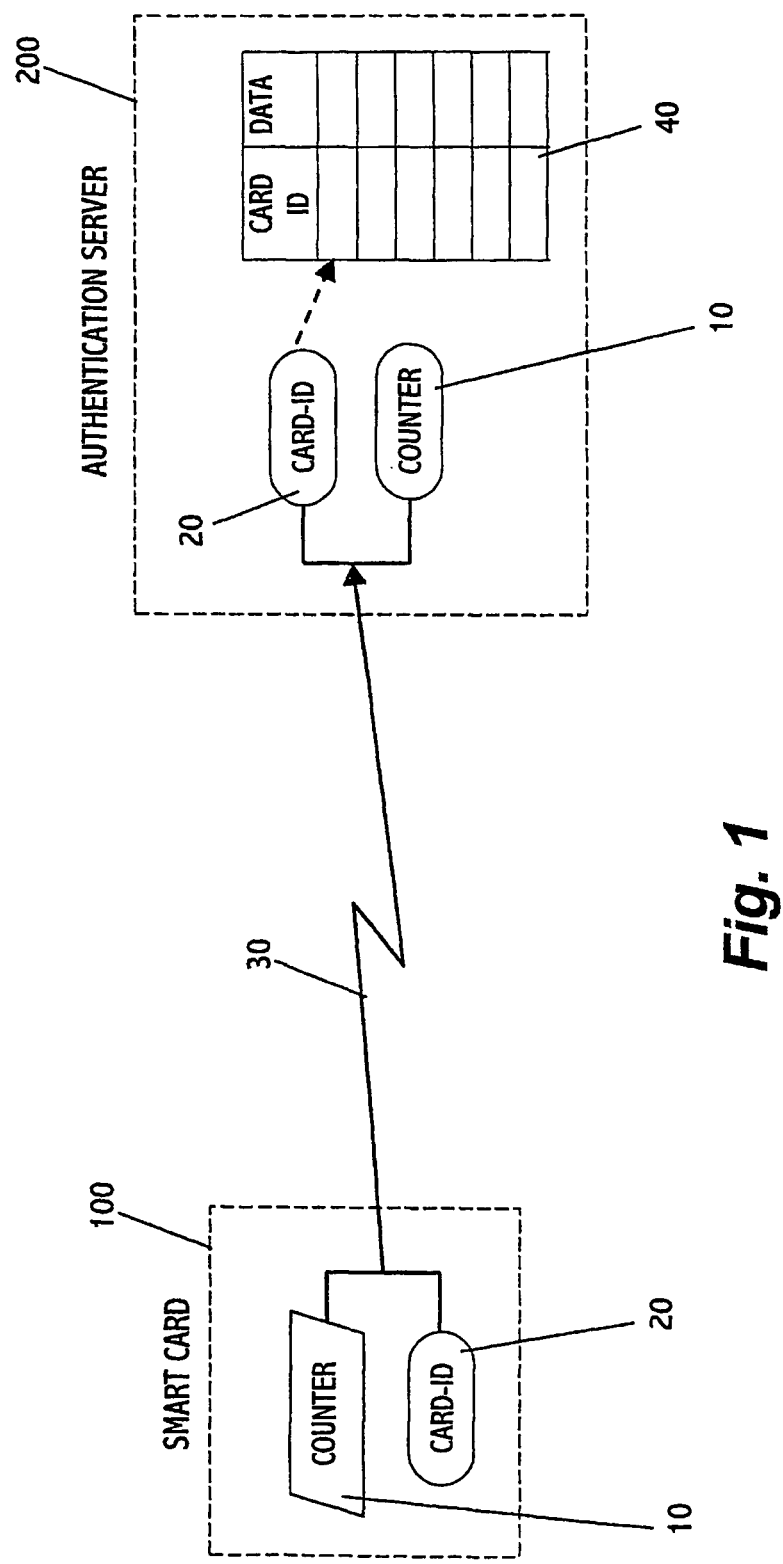
FIG. 1 schematically illustrates a process for detecting existence of forged devices, according to one embodiment of the invention.

An example of an identifying device is a self-powered electronic card (SPC) that performs wireless communication with a standard PC or telephone without using a card reader. The card transmits a user identification code to a PC, a mobile, or a regular phone, enabling online authentication and physical presence in online transactions. Of course, non-card devices, such as statues and pens, may be provided as well. The authentication system may be designed to be implemented on various computer or telephony networks, such as the Internet, extranets, and IVR systems.

Various cards and card related software and hardware which may be useful for carrying out and/or using the invention are described, for example in Ser. No. 60/278,010, filed Mar. 22, 2001, Ser. No. 09/853,017, filed May 10, 2001, Ser. No. 60/278,065, filed Mar. 22, 2001, Ser. No. 60/277,996, filed Mar. 22, 2001, U.S. patent application filed May 12, 2000, by applicants Alon Atsmon, et al., and entitled "Physical Presence digital Authentication System", PCT/IL99/00506 filed on 16 Sep. 1999, PCT/IL99/00525 filed on 4 Oct. 1999, PCT/IL99/00521 filed on 1 Oct. 1999, PCT/IB99/02110, filed on 16 Nov. 1999, PCT/IL01/00758 filed on 14 Aug. 2001, Ser. No. 09/820,358 filed Mar. 28, 2001, PCT/IL98/00450 filed on 16 Sep. 1998 and a PCT application filed on even date by applicant Comsense, et al. and having the disclosures of which are incorporated herein by reference.

The card may also support payment card legacy systems, such as magnetic stripe readers. It can be implemented, for example as a standard credit card or a bankcard, a membership card, or a gift certificate, and works both on the Internet and in the offline world. Additionally, a conventional smart card's electronic circuit (e.g. an electronic microchip) may be embedded in the SPC.

To use the card, in some embodiments of the invention, the cardholder squeezes a button provided on the card, while holding the card relatively close (e.g., approximately 3 inches from) to the front of the PC's microphone. The card then sends a sonic transmission of a unique, one-time code to the device's microphone.

In addition, a client software, which may be for example a communications layer embedded in a web page, receives this encrypted one-time code. The communication layer relays the code, unaltered (or as described below, for example, encoded and/or with data added), to a remotely located Authentication server for authentication. Current versions of the client software are generic database program based software, which are based on, but not limited to, Microsoft SQL and Oracle, for example.

Thus, the card, in some embodiments of the invention, converts PCs or telephones into point of sale terminals, enabling secure Internet shopping, banking, and financial account services.

The user software may be configured to receive the signal of an activated ComDot card (e.g., a card as described herein), launch a web browser and visit a specific URL, such as that of the card issuer.

The card may serve as a user authentication, loyalty and secure transaction system, based around a credit card sized layer of electronic circuitry. This circuitry may be powered by an on-card battery, and activated by a flat switch, embedded in a standard credit card.

After visiting the Web site of the manufacturer of the card, a communication layer (embedded in the Web site for example as an ActiveX control or JNI plug-in) may be cached into the user's browser. Upon card activation, the communication layer receives the signal from the card and authenticates the card through communication with a server running authentication software. The information transmitted by the card is received by a client software application, running on a Windows-compatible PC, or as part of a PC-based telephony Interactive Voice Response (IVR) or Computer-Telephony (CTI) system. Other communication methods may be provided instead Optionally, upon verifying that a complete signal was received, the client software application sends the received signal—via a secure HTTPs or SSL network link—to the Authentication Server. In some embodiments of the invention, no decryption of the transmitted signal is performed on the client. It should be noted that encryption by the client is a separate step from using an SSL link, as it is performed by different software units, over which different degrees of control are available and different degrees and types of attacks by a hacker (or other malicious person) may be perpetrated.

For remote authentication, the card's signal is optionally sent to the authentication server for example by the client software or an ActiveX control. The server software analyses this signal, then reports to the card issuer's or third party's web server as to whether the signal in question comes from a Valid (i.e. active card) or Invalid source.

In an exemplary embodiment of the invention, the authentication system employs unique, one-time cryptographic codes for enhanced security. This one-time code is generated and encrypted by the card, and remains encrypted until it reaches the authentication server software. Optionally, no decryption of the data, which is received from the card, is performed in the authentication server.

In an exemplary embodiment of the invention, when an e-wallet, merchant payment Web site or gateway, or other payment middle ware is equipped with a software client, the card authenticates cardholders to their payment card issuers and e-merchants, potentially reducing the problem of on-line fraud. Because the presence of a card in transactions can be proven (to some extent), cardholders shop online without fear of credit card theft.

In some embodiments of the invention, additional protection steps may be taken. For example, using a random generator with three keys with values unique to each device, using a CRC for validating that transferred information have not been changed and/or different encryption functions and pseudo-random numbers for each card.

In an exemplary embodiment of the invention, a Datagram structure used by the card may be as follows:
  Header (not encoded)
  Public ID (not encoded)
  Private (secured) ID+Counter value (encrypted by DES3)

EDAC (Error Detection And Correction code/information) Authentication of Cards on the Internet:

In an exemplary embodiment of the invention, a card is authenticated on the Internet using the following process:
1. The user activates the card by pressing the built-in button.
2. The card takes a counter value stored on internal, non-erasable memory and uses it as a seed value that is DES3 encrypted Then it transmits an acoustic signal carrying an encrypted message (e.g., the counter, a card ID, a time stamp and/or a transaction detail).
3. The PC's software receives the signal and uses the contained EDAC packets to ensure that the message is viable and has not been interrupted, and to correct errors if any. If the message is verified, the PC strips off the EDAC and sends the message to the authentication server without it being decrypted by the PC. The authentication system is optionally designed to work with a secure client-server communications link such as HTTPs or SSL. In some embodiments, the message is first transmitted to a client site, for example a vendor site, where it is optionally not decrypted either before having information optionally added, optional encryption applied and being transmitted to an authentication server.
4. The Authentication Server Software receives the message and performs a hash function on it. The output of this hash function is compared to a database of hash values maintained for each card. In an exemplary embodiment of the invention, only hash codes for the specified card are searched in the database. This feature is possible since the card ID number is also transmitted from the card to the Authentication server, thus allowing the server to limit the search process to a portion of the database, which corresponds to the specific card from which the transmission was received. If the hash function output of the received message appears in the database, the Authentication server reports to the card issuer's web server that the activated card is 'Valid'. If the hash output of the received card message does not appear in the database, or has been used in previous card activation, then the server reports that the activated card is 'Invalid'. The hash function employed is optionally a one-way function that cannot be reversed to find the initial data input. At no point is this data decrypted, and all the hashed data is optionally stored on a read media, potentially preventing accidental changes to this data.

Authentication of the Telephony Cards:

In an exemplary embodiment of the invention, a card is authenticated on the telephone using the following process:
1. A cardholder dials an enabled telephony service. An Interactive Voice Response and/or Computer-Telephony system answers the call, and the cardholder is prompted to activate his card. The client application (in this case the IVR and/or CTI application) receives the card transmission, and optionally forwards it to the Authentication Server (or a vendor site), where card authentication is optionally performed. At the server, telephony card authentication is optionally performed using a hash function process similar to that of the Internet cards.
2. The authentication server's 'Valid or Invalid' indication is forwarded to the IVR and/or CTI system, which can, for example, admits cardholders to its telephony system, or requests card re-activation, according to its login policies.

Communications Layer Software

In an exemplary embodiment of the invention, two different implementations of the communications layer is provided, however, other implementations may be used as well:
1. Tray Application: In this implementation, the communication layer is downloaded and installed by the user, typically in tandem with additional software provided by the card issuer (the communication layer could even be offered as a screen saver). Once installed, the communication layer runs in the background, waiting for a signal from the card. This persistently resident, "always on" implementation may be used, for example, for "electronic loyalty" applications, enabling one-click launch access to personalized web services. When triggered by the card, the persistently resident communication layer/tray application connect to the network, launch a browser, go to a specific URL, authenticate entry to the personalized service, and present the user with a personalized web service in a manner that is both convenient and secure.
2. Active X Control—Web-page Embedded Version: In an exemplary embodiment of the invention, the communication layer's is implemented in a small size, which allows implementation in a Web page embeddable, for example, ActiveX or JNI-plug-in format. Implementation in Active X, Netscape Plug-In, or in Java is useful for embedding the communication layer in web pages for automatic loading to users who visit the equipped Web site.

In this implementation, a first-time user would simply go to a particular card issuer web page in which the communication layer is embedded, and then activate the device. Possibly, no conscious user decision to download or install is required.

Authentication server

The Authentication Server software can be implemented on a PC system running a Windows NT 4.0 or higher operating system, and Microsoft SQL server for Database software.

ISO Compatibility

In an exemplary embodiment of the invention, the card will be ISO 7816 and ISO 7810 credit card tested, for example, by Visa certified labs. These tests include torsion testing, involving 1,000 bends of the card. The tests also include exposure to heat, cold, water and acids.

Card Security

In an exemplary embodiment of the invention, the card is secured physically and/or logically in order to prevent access to its secured data Logical security is optionally achieved by encrypting the card's 'Secret User ID' and counter value using the DES3 encryption technique. The card's public ID is transmitted without encryption.

Physically, the electronic circuit is optionally secured by its placement as the middle of five plastic layers. The two layers of plastic on either side of the electronics layer, and the card's lack of external connectors constitute a degree of physical security. Additionally, once the data is written to a card EPROM, the read and write fuses are burned, to prevent accessing the written information.

2 Unique, Triple DES (DES3 or T-DES) Keys Per Device/card

In an exemplary embodiment of the invention, the encryption used in the card is 2 key DES3 algorithm. Optionally, each card has two unique keys. These keys are randomly generated during the manufacturing process, for example, by a statistically safe, random generation mechanism. The keys are generated and written directly onto the card's non-erasable memory, and, as a security caution, are never stored outside of the card. In an exemplary embodiment of the invention, after using these 2-key DES3 and the hash function to generate the hash table, no trace of the two keys exists in the Authentication server. Optionally, the hash table is generated on the card and read off during manufacture. Then various fuses on the card may be destroyed, for example physically, or by providing the card with a suitable command, for example, to erase the hash table.

Optionally, the codes are prepared for particular customers, for example, so each customer can use his codes for validation. Optionally, the customer prepares the codes and only a hash is provided to the authentication server. The customer may then load the cards that he distributes, with the desired codes and/or hash values thereof. By providing the customer with a different hash value, the authorization server can allow the customer to perform his own validation, without compromising the validation at the authentication server.

One-Time Encrypted Code

In an exemplary embodiment of the invention, the card creates and encrypts a one-time code every time the card is activated. The encrypted data is, for example, 64 bits in length and contains, for example, two or more fields; the 'secret card ID' and the Counter value. After each activation of the card the counter value is optionally incremented, making each transmitted code unique. Alternatively, a same one time code may be reused, for example, within 1 minute.

EDAC

In an exemplary embodiment of the invention, this information is transmitted not encrypted in order to verify that transmitted message is complete and to correct any error that may exist.

Second Factor Authentication

The clients may be advised to use a second factor of authentication in tandem with the first factor token authentication. The second factor may be, for example, a PIN/password, secret question, voice verification, or other preferred authentication methods. In an exemplary embodiment of the invention, the described method does not put limitations on the type of second factor authentication technique that can be employed.

Server Software Security
Comparison Function

In an exemplary embodiment of the invention, the server authenticates a cardholder using a comparison function. The hashed version of the card's encrypted data bit stream is searched for in the hash database. Optionally, at no point is this data decrypted, and all the hashed data is a read only, preventing accidental changes to this data. The comparison function is used to compare the new counter click number (determined by the position in the hash table that matches, for example) with the last known counter click number. Decisions are optionally made according to the result of this function.

Limited External Communications

In an exemplary embodiment of the invention, the server can send only two messages to the outside world: 'Card Valid' or 'Card Invalid'. This feature potentially prevents hackers from knowing why the card was not validated by the server, information that is often important for improving attacks on the server. In intra-network, secure communications with a card issuer or trusted third party server, the server optionally provides additional information as to why a particular card was not authenticated. In any case, when the card is retried, it may pass the authentication, for example by showing that the supposed card holder has at least two one time correct (and optionally consecutive) codes.

Management

In an exemplary embodiment of the invention, the system will enable administration of various operations, which may be useful when issuing cards, for example described below.

Card Issuance

In an exemplary embodiment of the invention, a Card issuance process includes, in addition to the delivery of the cards to the users, one or more of the following operations:

i. Addition of the card details to the database (e.g., basic record and/or hash list)
ii. Association of the cardholder User ID and the Card ID (optionally performed during personalization)
iii. Activating the card's functionality. This may involve sending an adequate command to the server (e.g., in case the default is off). Alternatively, automatic activation may be performed, for example if two consecutive correct hash values are provided.

Card Revocation and Un-revocation

In an exemplary embodiment of the invention, for card revocation and canceling of such a revocation, one or both of the following two mechanisms are optionally provided:

i. A Web based management interface, which, after proper login, enables the operator/user to revoke cards based on the card ID.
ii. A Protocol based management interface, enabling a computer to automatically revoke cards using different protocols, as defined and agreed with a vendor and/or a user Card Expiration In an exemplary embodiment of the invention, expired cards, assuming that new ones have been issued, will go through the revocation process, while in parallel, a new link will be created between the User ID and the new card. In addition to this process, the record of the cards and the hash list are optionally backed up (e.g., in case the backups are not in the same place). However, in an exemplary embodiment of the invention, no backing up is performed, as the hash list is generally static.

Manufacturing

Manufacturing is typically the first process in the card life span.

In an exemplary embodiment of the invention, the card is assembled in one of the proprietary manufacturing lines, located within a Visa-certified facility. In an exemplary embodiment of the invention, a circuitry module is programmed with the manufacturer-Data, to be used later as the manufacturer-ID and Encrypted Data. The circuitry then goes through lamination and graphics, for example, cold lamination or hot lamination. The magnetic stripe (and/or Smart card module) is added, and the card is ready for personalization. Alternatively, the card may be personalized and/or various hash codes generated, prior to lamination.

Authentication Scheme:

In an exemplary embodiment of the invention, according to the invention, one of two authentication schemes is used. According to a first scheme, a counter is embedded within the Self-Powered Card (SPC) and is used as a basis for generating a random number. The SPC also comprises a button, such that each time the button is pressed (i.e. the card is 'clicked'), the counter's value increases, and a new random number is generated and transmitted to the authentication server along with the rest of the data.

Upon receiving the SPC's data at the authentication server, a portion of the data is hashed. Since each SPC activation generates a new random number, a new hash number is generated at the server, to conform to the new counter's value. Knowing the rule by which the counter's value increases allows calculating the next future counter's values. In an exemplary embodiment of the invention, a set of, for example, 10,000 (or any other number) of pseudo-random numbers is calculated, and the resulting numbers are hashed and stored in a database contained in the Authentication server, for example prior to the first card use. In an exemplary embodiment of the invention, there is no need for the server to calculate, store or to use in any way, the original counter values. These values are only generated once in the card (i.e. when a card is 'clicked'; one new value/number for each click) for further generating the random numbers. In the Authentication server, each unique hash number reflects a specific card 'click' rather than the actual counter's value.

Therefore, consecutive hash numbers in the server reflect consecutive card 'clicks' (i.e. activations).

In an exemplary embodiment of the invention, the Authentication process itself is carried out according to the following method: the server receives a random code data from the SPC. At least a portion of this data is hashed, and the resulting hash value is searched for in the server's database. If there is a matching number in the database, the corresponding SPC's 'click' number is compared against the last known 'click' number; i.e. the last time this SPC was authenticated. If the new 'click' number is equal or less than the last known 'click' number, the SPC is considered to be invalid. In this case the authentication server may hold any confirmation of transactions using this electronic card, or take any other action as/if required. A reasonable number of 'clicks' per time period may be allowed. For example, an average user may use the card for purchasing commodities, show the card to his friends, and click on the button unintentionally. For example, a card may be allowed no more than 200 clicks per day. Hence, by keeping track of the click number and/or its history, unreasonable increments that may be an indication of a problematic SPC, can be detected or identified as artifacts. For example, a SPC user clicks his card, and the Authentication server interprets the received data as 'click number 12'. If, however, at the same day the server receives another data but interprets it as 'click number 220', the Authentication server 'remembers' this click number (i.e. 220) and may decide to invalidate the card for this specific transaction. However, if later on the server receives from the same card a data that reflects a click number of 221, the card may be considered to be valid. Later on receiving click number 20, may be indicative of a real security problem. Optionally, the card (and server) uses a different set of hash numbers for each day.

According to a second exemplary Authentication scheme, a set of random numbers is generated, hashed and stored both in the card and in the Authentication server. Optionally, no trace of the way by which this set of numbers is generated exists anywhere in the system after completing the numbers generation process. For example, the set may be generated by skipping some numbers in a series, for example, every other number, or using a random jump.

In an exemplary embodiment of the invention, each time a card is 'clicked'; a pointer draws the next random number from the table, which is transmitted to the Authentication server. The server then searches for a matching hash number in its own table, in order to find its corresponding click's number, after which it takes whatever required action, for example, using the same way as described in the first Authentication scheme.

Optionally, the card ID number in the main table is used to reduce the searching time in the hash table. Alternatively or additionally, a reduction in search time is provided by removing used, old, and/or 'wasted', hash values from the hash table. a wasted hash number is a hash number that relates to (or is a representative of) false clicks; for example, whenever a card is clicked without its transmission being received at the Authentication server (e.g. accidental clicks).

Security: One possible purpose of the security is to allow the owner of a device to carry out transactions in a secure manner, e.g., to ensure that the owner, and only the owner, will issue a transaction. In an exemplary embodiment of the invention, achieving this object is provided by one or more of:

(a) Prevention of exact duplicating of an electronic card;

(b) Prevention of duplicating the operation logic of an electronic card;

(c) Encrypting information being transferred between the electronic card and the authentication server; and (d) Storing encrypted information at the authentication server and a reference information at the electronic card.

The authentication scheme described herein allows preventing a replay attack. However, replay attack is not the only security consideration. Optionally, one or both of the following issues is dealt with in accordance with an exemplary embodiment of the invention:

(a) The integrity of the transferred information between the electronic card and the authentication server; and (b) Protection against untrustworthy employees at the authentication server's side;

Security Scheme Based on ActiveX Control:

According to several embodiments of the invention, the device/card is used in Internet transactions. In an exemplary embodiment of the invention, there is a desire to prevent the risk of a hacker trying to pretend being a web merchant, by copying a merchant's web site. In other words, a hacker may be able to 'get in the middle' between a legitimate user and a merchant, thus becoming an intermediate, or by pretending to be a real merchant and receive payment without providing goods. In such cases, the hacker may, for example, send the user a message, pretending to be a genuine merchant, urging/tempting the user to reply. A legitimate user would not be able to tell whether he responds to the genuine merchant or to the hacker, and the hacker may take advantage of that fact by intercepting and abusively exploiting the data exchanged between the user and the genuine merchant.

In an exemplary embodiment of the invention, in order to protect both cardholders and web merchants (and other ISPs), a special means is used in conjunction with an ActiveX control. The ActiveX control is a generic software element embedded in most of today's browsers. Whenever an Internet user enters a web site for the first time, the home page may prompt the user a request to download an ActiveX file, after which it remains in the user's PC. This file may at least contain parameters regarding the particular web page. If the user enters another web page, the user does not have to load the Active X again, and the already existing ActiveX dynamically changes its attributes to comply with the new web page.

In an exemplary embodiment of the invention, a merchant must acquire at least one of two certificates in order to allow him to securely interact with other parties by using the Internet. These certificates may be issued, for example, by a Certification Authority (CA) or by the ASP itself. The first certificate is referred to as the 'client certificate'. This certificate is used by the Authentication Service Provider (ASP) to verify the merchant. The second certificate is referred to as the 'server certificate', and it is used to verify a legitimate Internet user.

In an exemplary embodiment of the invention, whenever a card authentication is required, the card is activated so that a data stream is transmitted from the card and received at the user's PC. Assuming that the ActiveX is operable, it receives the transmission and modifies it according to the following process, at the user computer and/or at a merchant computer:

1. the ActiveX optionally adds the merchant's digital signature (i.e. the merchant 'server certificate') to the received data. This operation does not alter the original data received from the card;

2. the ActiveX optionally, alternatively or additionally affiliates the specific web page parameters into the above signed data;

3. the ActiveX optionally, alternatively or additionally encrypts the resulting data by using the merchant's public key; and 4. the encrypted data is then forwarded from the merchant to the ASP. The ASP decrypts the data with its own private key, and the signed (by the merchant) data is extracted. The communication channel between the merchant and the ASP is secured, since it is carried out by using the SSL protocol and PKI technique.

Optionally, the ASP site (i.e. authentication server) has a list of all merchants' certificates and digital signatures, and stealing these two key elements; i.e. a digital signature and a certificate belonging to the same merchant, is necessary to execute a fraud. However, since it is almost impossible to steal these two elements, enhanced security may result. The data, which is transmitted from the card, is secured since the data from a legitimate user bears the ASP imprint, as is carried out by the ActiveX in the user's PC. A hacker may intercept a data sent from a legitimate user. However, the hacker cannot sign the intercepted data with the proper signature. Therefore, whenever the ASP receives a data transmission from a hacker, this data is most likely to have a false signature, and therefore is ignored.

Alternatively or additionally, a special attribute is added to the ActiveX in such a way, that whenever a user makes an attempt to load an ActiveX control, the ActiveX control searches, while on runtime, for the special attribute. If such an attribute is not found, the ActiveX control will turn off automatically, otherwise the ActiveX control is ready to analyze incoming signals and take further actions as required. Possibly, the special attribute may be given by the Authentication Service Provider (ASP) to each authorized merchant.

Alternatively or additionally, the following method is used, for example for increasing immunity to hackers. Each merchant assigns a special number to each user on a session basis; namely whenever a cardholder enters the merchant's web page, the merchant assigns the card user a random 'one-time' number. Upon activating the card, the ActiveX control is activated and the special number is added to the card's data and launched to the merchant's web server, where it is compared with the original number sent by the merchant. If several users enter the same merchant's web page essentially at the same time, each one of them is given a different number, and if a user exits and reenters the web page, he is given a number that differs from the previous number he had. Sending one-time numbers, and receiving them as a feedback, may ensure to the merchant that the user is really who he says he is. The card may be signed by the ActiveX control using the merchants code and/or using the card.

Authentication Server Databases:

In an exemplary embodiment of the invention, one or more of the following databases are provided for authentication, for example, at the server:

1. MAIN TABLE—as is explained elsewhere in the text, while carrying out the manufacturing phase of the card, a set of for example 10,000 hashed codes is generated, each code representing the futuristic data to be transmitted from a specific card. The whole set of hash codes/numbers is stored in this table. The main fields of the table are:
    1.1 HASH CODES—this field holds the generated 10,000 (or more, or less) hash codes. Every time a card is pressed, its 'one-time' code is received in the Authentication server, and its hashed result is searched for in this table.
    1.2 PUBLIC CARD ID—this optional filed stores a card's ID (or alternatively a registration number) that is received from the card un-encrypted. It should be noted that there may be a situation, where the number of issued cards is relatively large, in which case two cards may transmit exactly the same transmission. However, it is expected that the card IDs will remain unique. Additionally or alternatively, this ID number may be used to minimize the time required to find a hash code/number in this table.
    1.3 COUNTER VALUE—this optional field holds the expected future counter click's number of a specific card, in order to allow comparing between two consecutive data received from the card.
2. CARD_IDX TABLE—this optional table has one or more rows for each card. The main fields of the table are:
    2.1 CARD ID—this optional field represents the card's unique ID or registration number in the system.
    2.2 TIME—this optional field contains the timestamp of the last Authentication attempt.
    2.3 STATISTICS—this optional field holds the number of Authentication attempts and the number of failures and/or other statistics.
    2.4 LAST COUNTER VALUE—this optional field holds the last counter value for which the Authentication succeeded.
    2.5 LAST RESULT—this optional field holds an error code of the last Authentication attempt, or zero if the last Authentication was successful.
    2.6 STATUS—this optional field contains the status of the card, for example:
        "O.K.";
        "expired";
        "Not initialized"; and
        "Temporarily Locked"—this state may be initiated after a succession of erroneous Authentication attempts within a given period of time.
3. USER TABLE—this optional table contains one or more rows for each card issuer (which may or may not be the same as vendors). The main fields of the table are:
    3.1 CARD ID—this optional field is as above.
    3.2 USER ID—this optional field contains a user ID, such as a credit card number.
    3.3 Private Identification Number (PIN) VALUE—this optional field appears in clear text or in hashed form. This number is not necessarily included in the card and therefore may have no role in the above Authentication procedure. This number is similar to a hardware/device serial number.
    3.4 User Defined Fields (UDF)—these optional fields (for example 10 fields but other numbers are possible too) are reserved for each card user/issuer, which may decide to fill them with various data, such as card's holder bank account number, address, telephone number, allowed credit, etc. Each field may contain, for example a maximum of 64 characters.
4. LOG TABLE—this optional table lists every Authentication attempt (or some—e.g., only failures and the last success). Every Authentication attempt adds a new record to this table, no matter what card's issuer or cardholder is involved. Some possible fields for this table are:
    4.1 ID—optional, a number identifying the log entry.
    4.2 TIME—optional, the time stamp of each Authentication attempt.
    4.3 CARD ID—optional, if the card ID is not found, a generic value is returned.
    4.4 COUNTER—optional, counter of card for which an Authentication attempt was performed. If such a counter is not found, a generic value is returned.
    4.5 RESULT—optional, this field contains the results of the Authentication attempts.
    4.6 USER NAME—optional, stored here if it was provided by the service provider.

4.7 USER IP ADDRESS—optional, stored here if it was provided by the service provider.

5. MANAGEMENT LOG TABLE—this optional table contains information about card management operations performed via Web-site management tools. Some possible fields for this table are:

5.1 ID—optional, number identifying the log entry.

5.2 OP CODE—optional, operation code, such as "Suspend Card", "Change and Card Password".

5.3 OP VALUE—optional, the result of the operation (OP CODE).

As was described herein, in an exemplary embodiment of the invention, whenever an Internet transaction is carried out, a card issuer can not be sure that the transaction code given by the merchant and the authenticated card relate to each other. Since a web site is involved, whether the merchant's or the card issuer's, the problem can is optionally solved by using a proper ActiveX file, which may include various parameters relating to the merchant and/or to the transaction and/or the user/buyer, such as PC's IP address, timestamp, amount of transaction, URL and/or signature.

In some embodiments of the invention, a same device/card may be used in various applications, by using the same encrypted data generated by the card. The right application is selected according to the hash function applied by the corresponding Authentication server. For example, lets assume that there is a 2-application card. whenever this card transmits its data to a specific Authentication server, this server applies its unique hash function to Authentication the card. Should the user transmit his card data to the second Authentication server, another hash function is applied, to generate a different hash number. The differing hash functions and/or other associated information may be added, for example, by the vendor or by a subsidiary authenticator which may use the ASP for providing some authentication services.

FIG. 1 schematically illustrates a process for authenticating a SPC, according to one embodiment of the invention. A card 100 transmits a counter value 10 and a card-ID 20 over a connection 30, to an authentication server 200, where the card ID is used to lookup in a table 40. Optionally, connection 30 is encoded, for example using the cards one time code.

Figure 2:
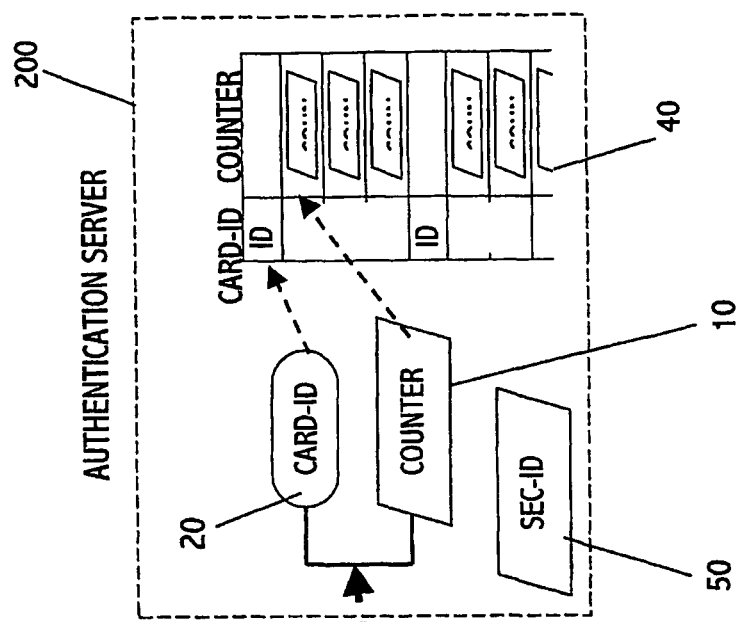
FIG. 2 schematically illustrates an authentication scheme of a device, according to an exemplary embodiment of the invention.
Figure 2:
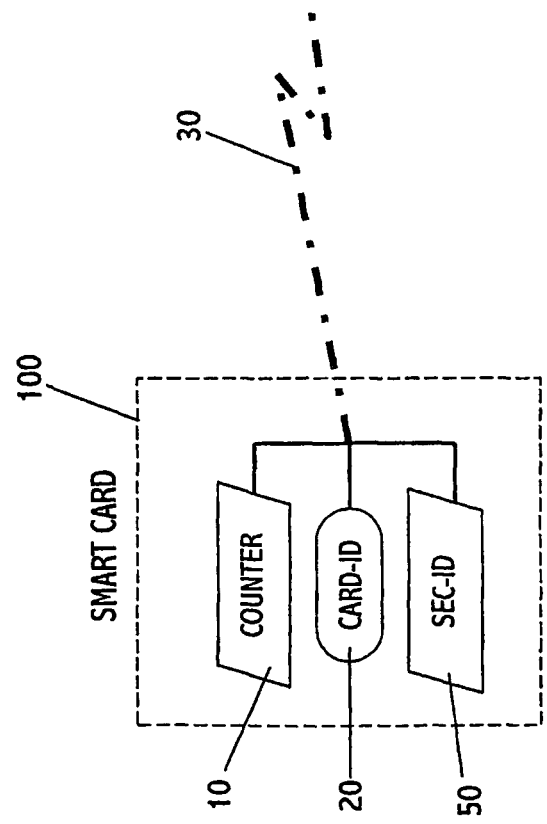

FIG. 2 schematically illustrates an authentication scheme of a device, according to another preferred embodiment of the invention. In this embodiment, a further security is provided by employing a security ID (e.g., a key) 50, at the card, for example one which is a public key of authentication server 200. The data may be hashed, as described above and used to lookup in a hash table 40, for example according to card-ID.

Figure 3:
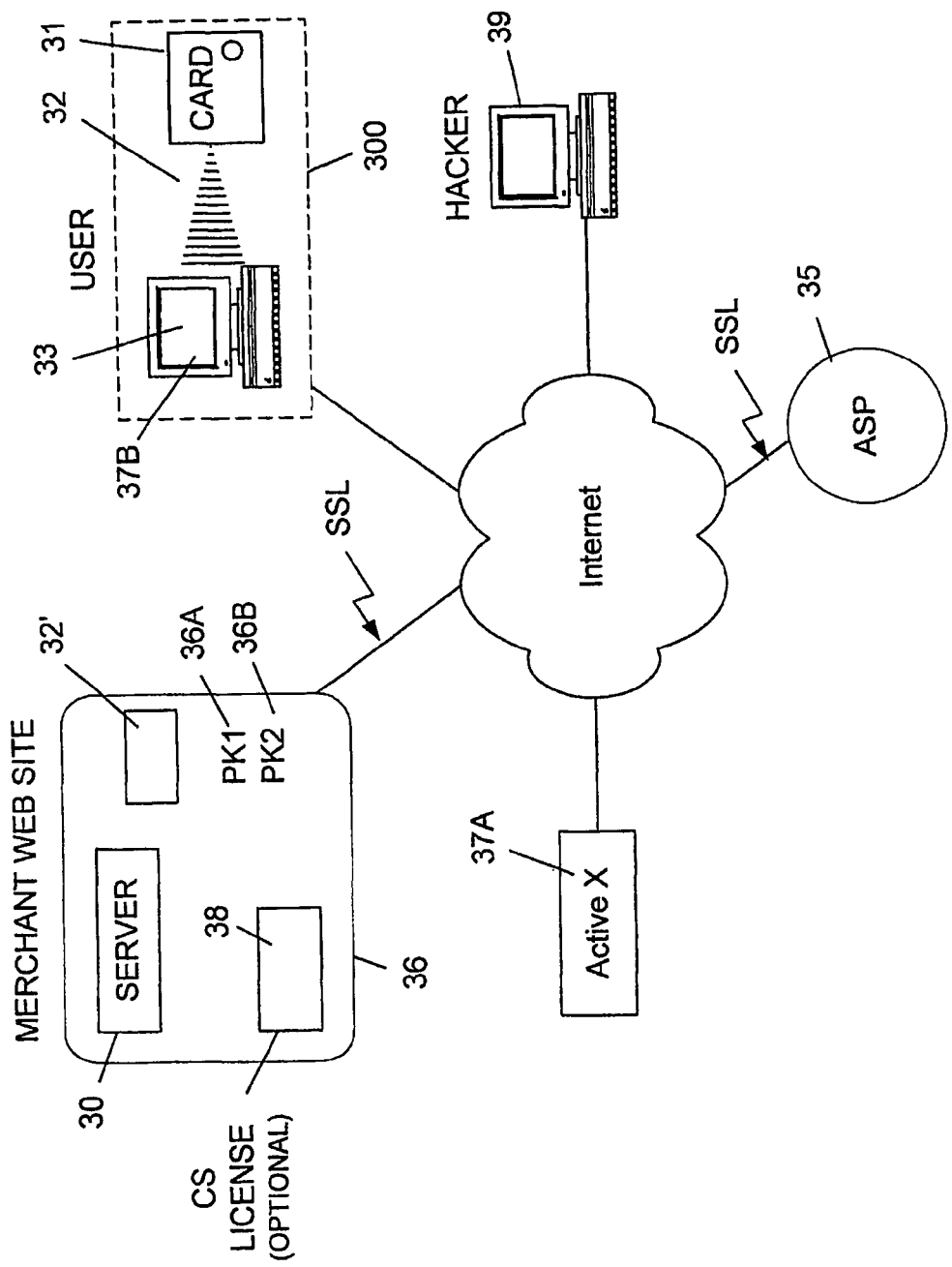
FIG. 3 schematically illustrates using an ActiveX control to secure Internet transaction, according to a preferred embodiment of the invention.

FIG. 3 schematically illustrates an authentication situation, wherein an authentication service provider 35 (ASP) authenticates a user 300:31 (i.e. potential buyer) before carrying out an Internet transaction with a merchant 36, in accordance with an exemplary embodiment of the invention. By using his PC 33, the user 300 enters the merchant's web page 36. Entering the merchant's web page 36 for the first time prompts the user to download a copy of the generic ActiveX control 37A to the user's PC 37B. If the cardholder wishes to carry out a transaction, he presses his card 31, which in turn launches the card's encoded details to the PC 33 by transmission signal 32. In an exemplary embodiment of the invention, the ActiveX control on the PC 33 has the capability to identify the transmitted signal 32; e.g. by detecting its frequency, transmission duration, checksum bytes or any combination of these attributes. If the transmitted signal is considered to be valid, the ActiveX control optionally digitally signs the card's data with the merchant web server's certificate. The ActiveX control optionally adds, to the signed data, the specific web page parameters, and optionally encrypts the resulting data by using the ASP's public key (or a public key relating to the merchant, for further verification by the ASP). The encrypted signal 32' is then sent to the merchant's web server 36. The merchant optionally adds his public key 36A and forwards the data to the ASP 35 optionally using the Secure Sockets Layer (SSL) protocol, which is a protocol for managing the security of a message transmission on the Internet.

In an exemplary embodiment of the invention, the ASP owns the Authentication Server, which optionally performs one or both of two principal tasks, one of which is to verify the merchant, and the second is to authenticate the card itself. Verifying the merchant and the user is simultaneously carried out by the ASP by comparing the received merchants server's certificate to the ASP's list. If the ASP finds it in his list (or using a hash thereof compares it to a suitable list), it indicates that the merchant is really who he says he is (e.g., if the ASP himself gave the certificate to the merchant). On the other hand, since the merchant certificate was added to the user's data in the user's PC, it also indicates that the user is really who he says he his, and the card authentication may be carried out.

In an exemplary embodiment of the invention, the ActiveX 37A has an important role in the above-mentioned process, since it collects details from one or both of the merchant web page 36 and the user's PC (33), and digitally signs it with a server 30 certificate 36B of the merchant (which was provided to him by the ASP). The ActiveX also encrypts this data by using the public key of the ASP.

Figure 4A:
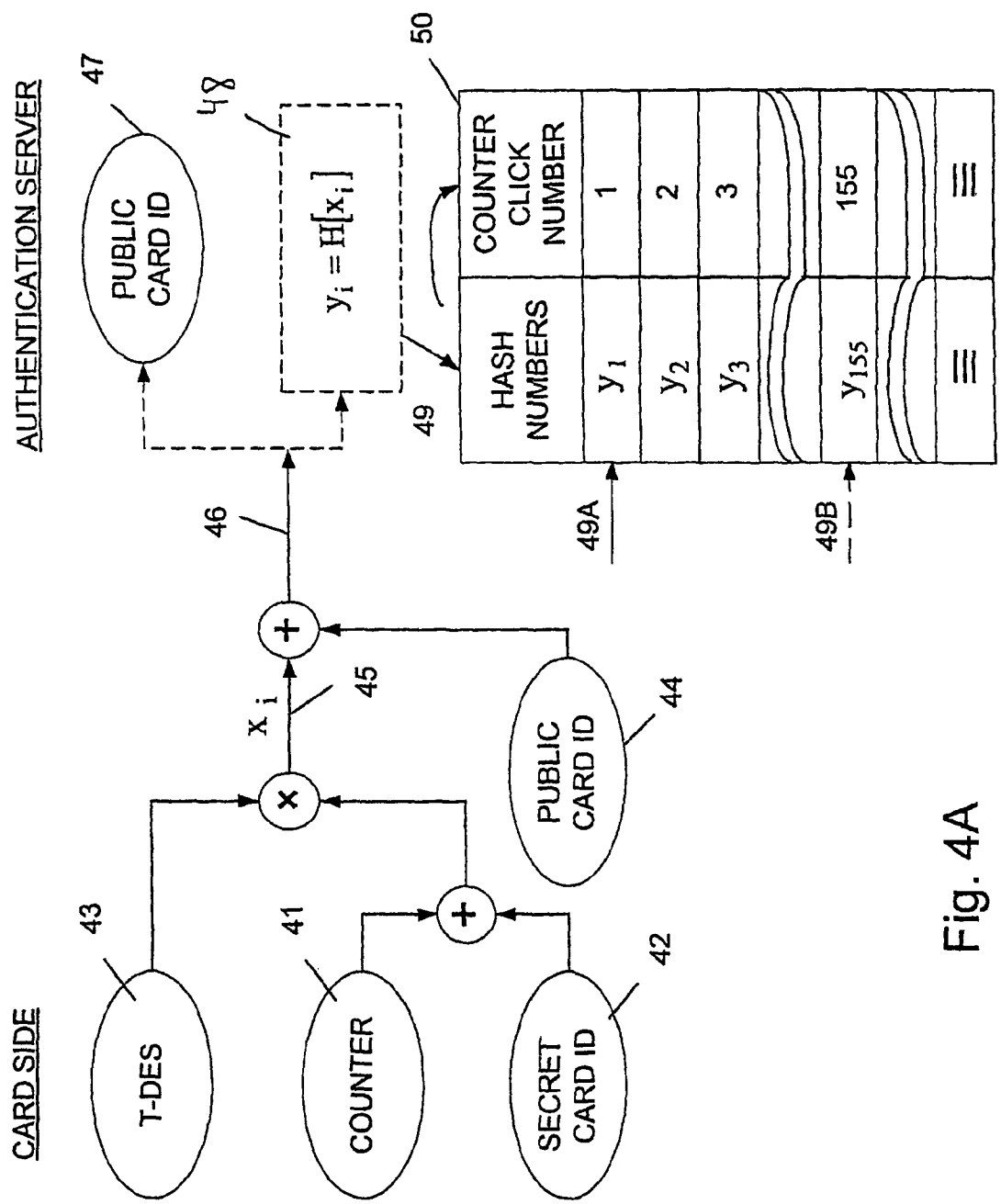
FIG. 4A is a flow-chart of an authentication process, according to one embodiment of the invention.

FIG. 4A illustrates an Authentication scheme, in accordance with an exemplary embodiment of the invention. When the card is manufactured, a pseudo-random numbers generator (RNG) generates at least the secret card's ID number 42, the initial counter value 41 and a 2-key T-DES (43). The 2-key T-DES is used to generate a random number, from the latter two types of data, each time the card is activated (i.e. 'clicked'). The 2-key T-DES is optionally permanently stored inside the card. Another mechanism is optionally stored inside the card, of which purpose is to change the counter value 41 each time the card is clicked. Since the public card ID 44 typically does not play any role in the Authentication process, it is added to the transmitted signal 46 after the generation of the random data $X_i$ (45). It should be noted that the 2-key T-DES is only an option to generate the random numbers in the card, and other pseudo-random generators may be used instead.

Since each transmission 46 from the card yields a progressively higher counter value, a new data content 45 is generated, which is a reflection of the secret card ID 42 and the counter's value 41. Knowing the rule by which the counter's value changes, an arbitrary-sized set of future numbers can be anticipated. In an exemplary embodiment of the invention, the card is expected to withstand at least 10,000 squeezes/presses, a set of 10,000 random numbers is hashed and stored in a database 50 or 40 (which is optionally contained in the Authentication server).

Optionally, whenever the card is clicked, the card's counter value increases according to the predefined rule. The increased counter's value 41 and the card's secret ID number 42 are used to generate a random number by applying the card's internal two predefined keys 43 (T-DES). The random number 45 is transmitted, along with the public card ID 44, to the Authentication server through a receiving means; e.g. a PC.

Optionally, upon receiving the transmitted data 46 from the card, the Authentication server extracts the public card ID (47), and generates from the remaining data ($X_i$) a hash number 48 (Y$_i$), and the hashed number is searched for in the hash database/table column 49 of table 50.

In an exemplary embodiment of the invention, the rows in the hash table are arranged according to the original counter values; namely the first row of the table contains the hashed number 50: y1 which represents the initial counter's value, the second row represents the second counter's value and so on.

Optionally, the Authentication procedure is based on the counter click number (see table: 50). If the card is clicked for the first time, its counter's value is expected to be the initial random value as was set during the manufacturing process of the card. Upon receiving the transmitted data 46 from the card, the Authentication server applies the hash function 48 on this data to yield the first hash number y1 (49A). Since y1 represents the original first counter value, it is expected to be found in the first row in table 50, which corresponds to counter click number 1 (see table: 50). If y1 is not found in table 50 or is not found in a low row number, which can be for example pre-defined or a property of the user, which may be for example learned by the system, the card is assumed to be illegitimate.

When the Authentication server receives the second transmission 46 from the card, the server hashes 48 the data X$_i$ ('i' denotes the card's click number) to yield another hash value 48: y$_i$, after which it is searched for in table 50. It is taken into account that a cardholder might mistakenly squeeze his card several times between each two transactions, but nevertheless, there is still a logical limit to such accidental squeezes. A decision-making algorithm relating to this logical limit, may take into account different considerations. Therefore, if the second received data yields a hash number like y8, which represents counter click number 8, it might be considered a viable transmission of a legitimate card. If, however, the second received data yields a hash value like y155 (49B), the card, from which this data was transmitted, may be considered illegitimate, or other decisions may be taken.

The Authentication procedure optionally relates, therefore, to the difference between two consecutive card transmissions as received in the Authentication server and represented by the counter click number.

In an exemplary embodiment of the invention, the same Authentication procedure repeats itself every time the Authentication server receives a transmitted data. Each received data is hashed, searched for in the hash table and the corresponding counter click number is compared against the last known counter click number.

Figure 4B:
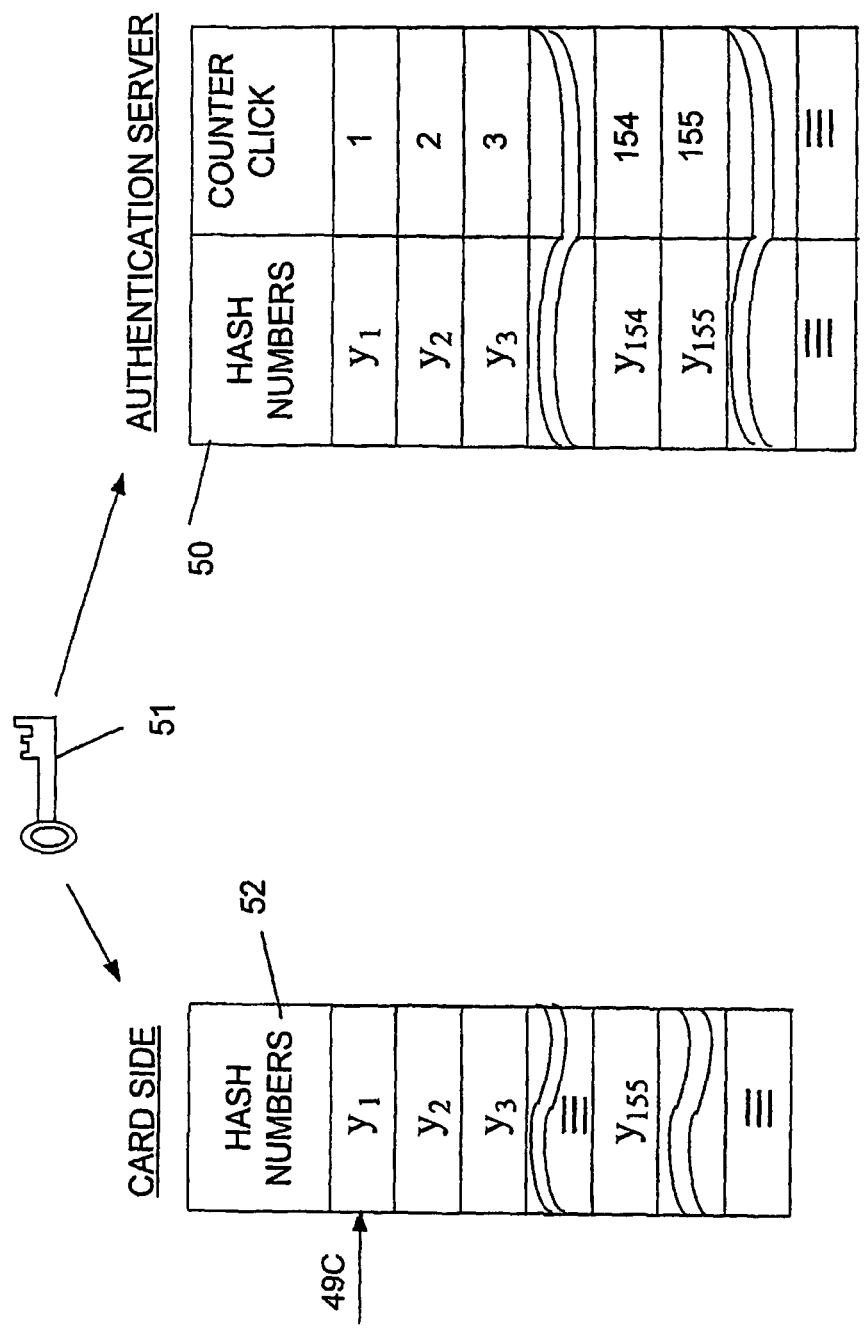
FIG. 4B is a flow-chart of an authentication process, according to another embodiment of the invention.

FIG. 4B illustrates a second, alternative, possible Authentication scheme. When the card is manufactured, a set 52 of pseudo-random numbers is generated, for example, by using a key 51 and hashed. The hash numbers are stored both in the card and in the server 50. Alternatively, original numbers may be stored in one or both locations. The random numbers generator/key 51 may be any generator known in the art. After completing the process of generating, hashing and storing the hash numbers, the key is discarded. Whenever a card is clicked, pointer 49C points to the (new) consecutive hash number, which is to be transmitted from the card. In the server, each received hash number (y1, y2, etc.) is searched for in table 50, and if it is found, the corresponding counter click number is determined.

The Authentication process is continued the same way as in the first scheme; namely by comparing the counter clicks of consecutive receptions from a card.

In some embodiments of the invention, information is transmitted from the authentication/identification device over the telephony system. The telephony system is typically designed to deliver audio signals, and thus high frequencies are filtered, and therefore transmission of ultrasonic signals is usually acceptable over the regular telephony system. Thus, a sonic signal is utilized in telephony implementations. A same card may be used to transmit simultaneously both sonic and ultrasonic signals. More particularly, in an exemplary embodiment of the invention, the information is transmitted utilizing Frequency Shift Keying of sonic signals (herein after will be referred to as multitone FSK).

In multitone FSK n different data symbols are represented by n different frequencies (i.e., each symbol is assigned a predefined frequency), so that the decoding of such a transmission is carried out by modulating data symbols utilizing transmission of signals of predefined frequencies. According to an exemplary embodiment of the invention four frequencies F0, F1, F2, and F3, are utilized for the multitone FSK signal.

Figure 5A:
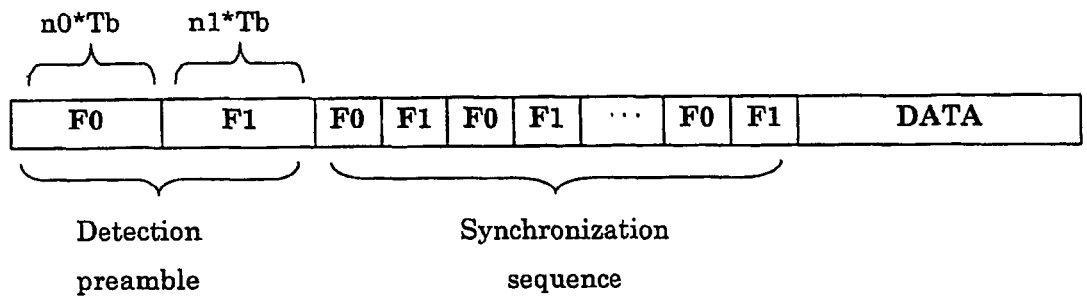
FIG. 5A schematically illustrates the structure of a multitone FSK signal according to an exemplary embodiment of the invention.

FIG. 5A schematically illustrates the structure of the multitone FSK signal according to an exemplary embodiment of the invention. The transmission starts with a detection preamble comprising two frequencies F0=1/T0 and F1=1/T1 (e.g., pure sinusoids, however, other wave forms, for example pre-filtered, may be used instead). The first part of the detection preamble comprise a signal of frequency F0 over an interval of n0*Tb seconds, and the second part of the detection preamble comprise a signal of frequency F1 over an interval of n1*Tb, where n0 and n1 are integers and Tb is the duration in seconds of a symbol, called the symbol interval. The frequency sequence utilized for detection may be comprised from any number of predefined frequencies, for example, from the set of frequencies utilized for FSK encoding. The detection preamble is optionally followed by a synchronization sequence and then by the encoded data. Other orders and/or signal parts may be provided, for example, an error correction section.

Figure 6:
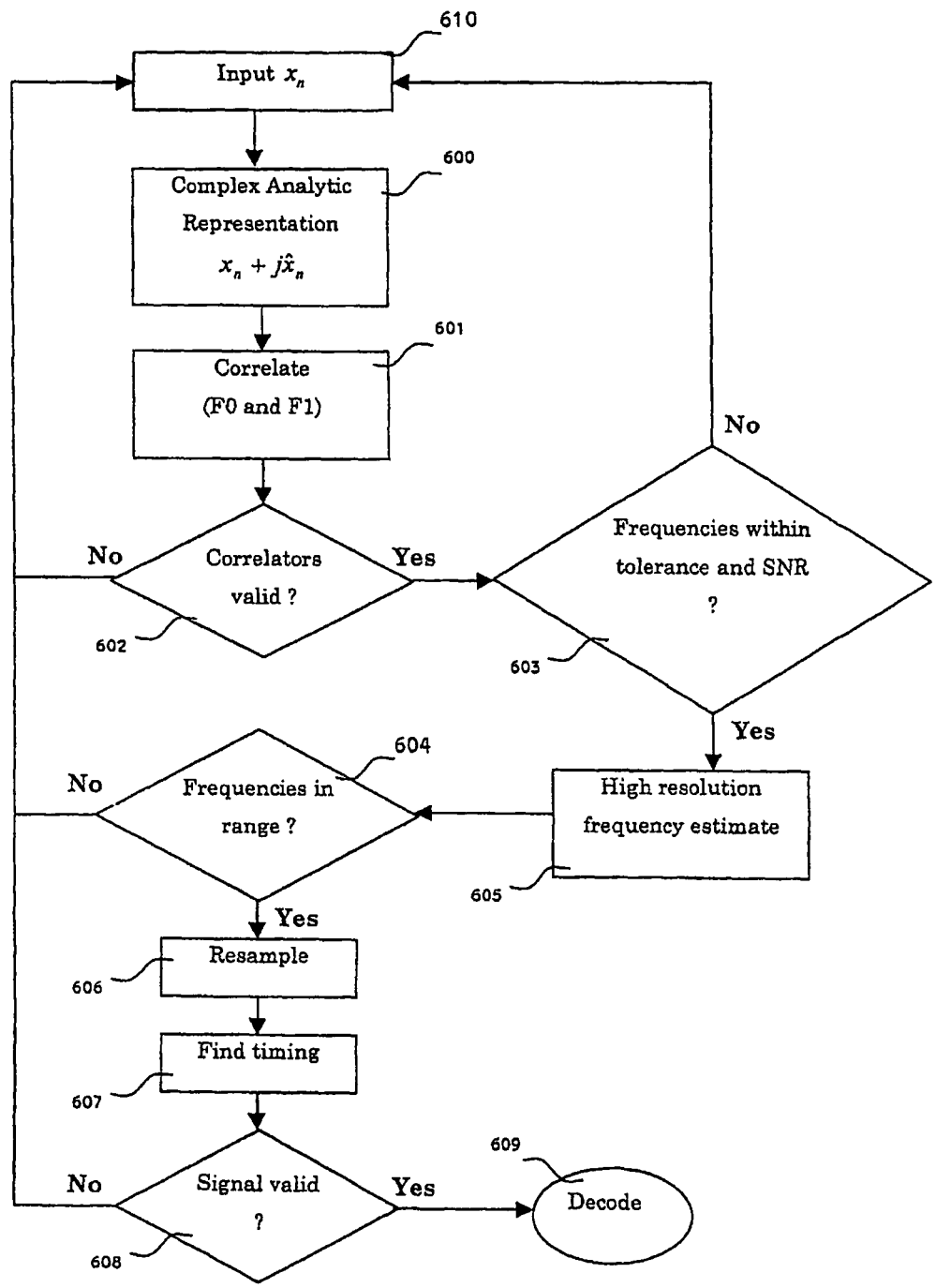
FIG. 6 is a flow chart illustrating the process of detection and estimation of multitone FSK signal, in accordance with an exemplary embodiment of the invention.

The process of signal detection and encoding is illustrated in FIG. 6, in a form of a flow chart. The Hilbert transform $\hat{x}_n = F^{-1}\{H(\omega)X(\omega)\}$ of the signal $x_n$, received in 610, is utilized in 600 to obtain the complex analytical representation $x_n + j\hat{x}_n$ of the received signal. The complex analytic representation $x_n + j\hat{x}_n$ is used because under this model sinusoids, which are functions with time varying amplitudes, become complex exponentials of unit magnitude. Sinusoidal signals correlated with each other with an unknown delay can yield a zero output, even when the two are of the same frequency. This can be seen from the following $$\int_a^b \cos(\omega t)\cos(\omega t + \theta)\,dt = \frac{1}{2}\left(\cos\theta \int_a^b dt + \int_a^b \cos(2\omega t + \theta)dt\right)$$

for $\theta = -\pi/2$, $a=0$, $b=T$, and $\omega = 2\pi/T$, we have $$\int_0^T \cos\left(\frac{2\pi}{T}t\right)\sin\left(\frac{2\pi}{T}t\right)dt = 0$$

For the complex analytic representation, however, we have $$\int_0^T \exp\left(j\frac{2\pi}{T}t\right)\exp\left(-j\left(\frac{2\pi}{T}t+\theta\right)\right)dt = \exp(-j\theta)\int_0^T dt = T\exp(-j\theta)$$

So that this form of correlation detection is less vulnerable to the delay incurred between the correlated windows θ, or the duration of the correlation a-b, while allowing other signals to be erroneously detected. However, in the sonic transmission situation, considering expected echoes and/or frequency dependent artifacts and delays with signal generating hardware, such a tradeoff may be desirable. In addition, the tradeoff may allow a less computationally intensive detection method to be used, so that the PC may be used as a detector, rather than a dedicated DSP. Such a tradeoff may also be desirable in other problematic situations, for example, detecting RF signals transmitted by such a handheld card and detecting ultrasonic signals transmitted by the card and received by a non-dedicated microphone.

Figure 5B:
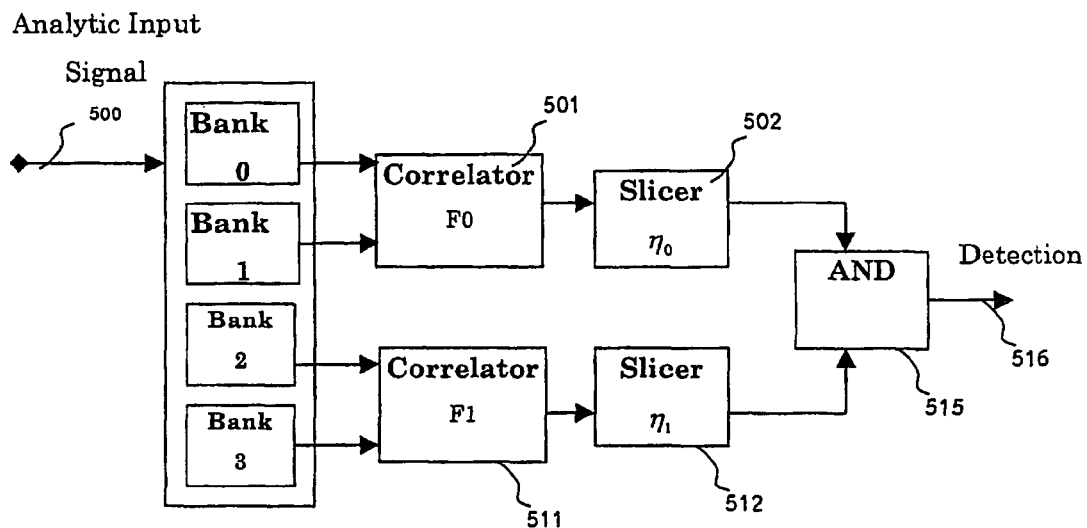
FIG. 5B schematically illustrates a detector for a multitone FSK signal, according to an exemplary embodiment of the invention.

At 601, 602, 603, 604, and 605, the detection of a transmitted signal is performed, for example based on correlation tests as illustrated in FIG. 5B. The detection is, for example, based on the correlation of 601 obtained by the correlators 501 and 511. The correlation in 601 is performed on the received signal and a delayed portion of the received signal for the purpose of detecting the sinusoids F0 and F1 in the detection preamble of the transmission. Alternatively, other detection methods are used.

The correlator 501 correlates the samples received in the interval $t-(n_0T_b)/2 \le \tau \le t$ (Bank 0) with the samples received in the interval $t-(n_0T_b) \le \tau \le t-(n_0T_b)/2$ (Bank 1), where t is a given moment in time. Similarly, the correlator 511 correlates the samples received in the interval $t-(n_0T_b)-(n_1T_b)/2 \le \tau \le t-(n_0T_b)$ (Bank 2) with the samples received in the interval $t-(n_0+n_1)T_b \le \tau \le t-(n_0T_b)-(n_1T_b)/2$ (Bank 3). The choice of symbol interval $T_b$ used in calculating the above correlations is optionally derived from considerations regarding the hardware that generates the transmission waveform. In accordance with the hardware, minmum and maximum symbol durations $T_b$ are optionally identified, from which the correlator will use the minimum. In this way, the correlators may be better guaranteed to exclusively identify their intended frequencies.

In 602 the correlators results are validated, this is optionally performed utilizing slicers 502 and 512. The slicers 502 and 512 optionally issue a TRUE indication whenever the correlation result is greater that a predetermined threshold, $\eta_0$ and $\eta_1$, respectively. If the signal received is of the form depicted in FIG. 5A, than the output of correlators 501 and 511 will indicate a maximal correlation, and slicers 502 and 512 will issue a true indication, which will result in issuing a TRUE indication on 516 (i.e., signal detection). In an exemplary embodiment of the invention, the threshold is determined based on the noise level, for example, by analyzing the amplitude level in a known part of the signal for example, the preamble.

Alternatively or additionally to the above correlation metric, the complex analytic signal may be used to estimate the frequency in the given windows (F0 and F1). Assuming that the signal in the window is a complex exponential, then through the entire window, we can expect the waveform to look like $$r_n = e^{j\omega n + \theta} + v_n, \; n = t-n_iT_b, \ldots, t$$

where $v_n$ is noise. Accordingly, multiplying any sample $r_n$ by its delay conjugated $r_{n-1}^*$ will yield the constant $$r_n r_{n-1}^* = e^{j\omega} + \ldots$$

Thus, by finding the angle of the complex number $r_n r_{n-1}^*$ and averaging over the window $n=t-n_iT_b, \ldots, t$, an estimate of the frequency $\omega$ may be found. Optionally, the estimate is compared with a bounds on what frequency are allowed, which bound is optionally defined based on the inherent inaccuracies in the hardware that generates the signal and/or well as the minimum SNR allowed. Therefore, a signal may be accepted based on whether it has sufficient correlation energy (from the correlators 501 and 511) and/or whether it has an acceptable frequency.

On the other hand, if one of the correlation results, from 501 and 511, is not higher than the respective threshold ($\eta_0$ or $\eta_1$), the correlation is invalid, and the process starts all over again from 610 as a new sample is retrieved. If the correlation passes the validation test in 602, in 603, another test is optionally performed to determine whether the frequencies and the SNR (Signal to Noise Ratio) are within an acceptable tolerance for detection. The frequencies are optionally estimated using an approach described in "A Fast and Accurate Single Frequency Estimator." by Kay, S M, IEEE Transactions on Acoustics, Speech, and Signal Processing, Vol 37, No 12, December 1989, where the data used in the Kay analysis is the same as that already in the delay lines for using the correlator detector described previously, whereas the SNR is determined by using a window of delayed samples to estimate the frequency-dependent noise power. Once the noise power is estimated, detection is optionally determined using statistical hypothesis testing between the energy at the output of the received correlators and the energy at the same frequency, as estimated from the noise window. Ultimately, the threshold is optionally calculated using the Neyman-Pearson criterion. (This approach is described in U.S. patent application Ser. No. 09/570,399 of the same applicant). If it is determined that frequencies and the SNR are not acceptable for detection the process starts again from 610 (as a new sample is retrieved).

After high resolution estimation of the transmitted frequencies is performed, 605, the frequencies obtained are optionally tested in 604, to determine whether they are in an acceptable range in view of the frequencies deviations. As before, if it is determined that the estimated frequencies are not in an acceptable range, the process starts again from 610 (as a new sample is retrieved). If the estimated frequencies are in range, in 606 resampling (interpolation) is performed so that the symbol interval $T_b$ will be an integer multiple $k_s$ of the new sampling interval $T_s'$, so that $T_b = k_s T_s$. By forcing this relationship through interpolation, the data frequencies, which are all related to the symbol interval by the relation $$f_i = \frac{c_i}{T_b}$$

with $c_i$ an integer, will generally be orthogonal to each other in the digital domain with samples spaced by $T_s'$. In this way, when detection is performed, interference between symbols is optionally minimized. The resampled signal is then optionally utilized in 607 to calculate the signal's timing from a known preamble, (This approach is described in U.S. patent application Ser. No. 09/570,399 of the same applicant), which is utilized in 608 to further determine if the signal is valid. If it is determined that the signal is invalid, the process starts again from 610 (as a new sample is retrieved). If a valid indication is obtained in 608, detection is completed and the decoding operations are performed in 609. Other detection schemes, for example with fewer levels or with a greater number of levels and/or with additional and/or alternative verification criteria, may be used.

Figure 7:
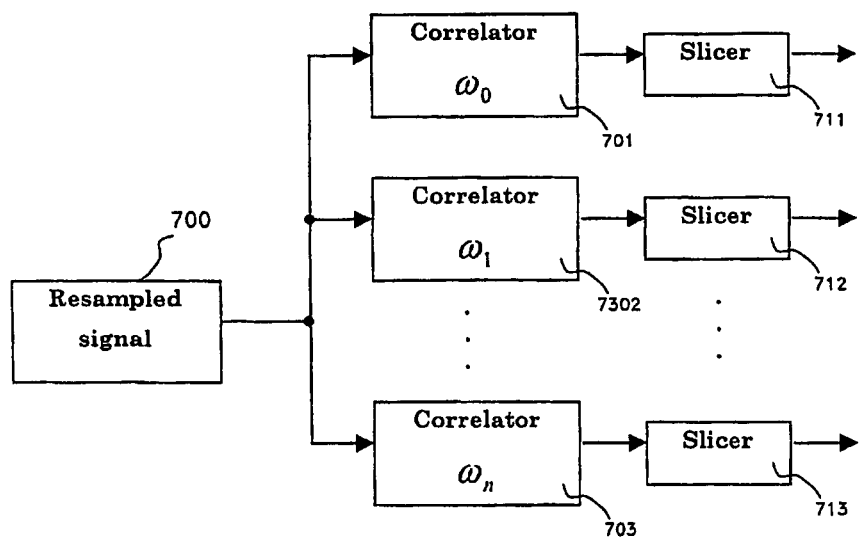
FIG. 7 schematically illustrates a method for decoding a multitone FSK signal, in accordance with an exemplary embodiment of the invention.

FIG. 7 schematically illustrates the decoding operation, according to a preferred embodiment of the invention. The resampled signal, obtained in 606, is correlated in correlators 701, 702, and 703. The number of correlators is optionally the same as the number of different frequencies (symbols) utilized for the FSK transmission. Alternatively, a single correlator may be reused. The resampled signal 700 is correlated with the estimated frequencies for each signal $\omega_0, \omega_1, \ldots, \omega_n$, which were estimated, for example, from the Kay algorithm referenced above. The slicers 711, 712, and 713, test the output of each correlator 701, 702, and 703, respectively, to determine if a maximum correlation is obtained. Whenever the output of a correlator 701, 702 or 703, exceed the threshold of the corresponding slicer, a match indication is issued on the output of the respective slicer. This indication is actually a decoded symbol.

It will be appreciated that the above-described methods of authentication may be varied in many ways, for example, changing the order of steps or the number of security mechanism used. While the application has focused on card authentication over the Internet, other authentication situations are intended as well. In addition, a multiplicity of various features, both of methods and of devices has been described. Where methods are described, devices for carrying out the methods are also contemplated. It should be appreciated that different features may be combined in different ways. In particular, not all the features shown above in a particular embodiment are necessary in every similar exemplary embodiment of the invention. Further, combinations of the above features are also considered to be within the scope of some exemplary embodiments of the invention. Also within the scope of the invention are software hardware and/or firmware for carrying out the methods, and devices and/or software for programming existing devices to make the device comply with the methods described herein. Section headings where they appear are meant for clarity of browsing only and should not be construed as limiting the contents of a section to that particular section. When used in the following claims, the terms "comprises", "includes", "have " and their conjugates mean "including but not limited to".

It will be appreciated by a person skilled in the art that the present invention is not limited by what has thus far been described. Rather, the scope of the present invention is limited only by the following claims.

The invention claimed is:

1. A method of authenticating, using an authentication server, the use of an authentication device by at least a first user over a communication network via an intermediate communication device at a vendor location, comprising:
   receiving an interaction request to communicate with said intermediate device by said intermediate device from said first user;
   responding to said interaction request by said intermediate device, to said first user;
   receiving an authentication datagram by said intermediate device, said authentication datagram including data from the first user, in response to said responding;
   protecting said datagram by said intermediate device, by at least one of changing, adding to, encrypting and signing of said datagram prior to said authenticating;
   adding a vendor-associated information item to said protected datagram by said intermediate device to link together said vendor-associated information and said protected datagram, prior to said authenticating;
   forwarding said linked vendor-associated information item and said protected datagram to said authentication server via the communication network, by said intermediate device, for authentication of at least one of the vendor and of the first user;
   comparing said datagram or a hash thereof to a hash table at said server;
   generating a binary validation answer having only a single bit by said server without an associated explanation;
   outputting said binary validation answer for authentication of the vendor;
   providing to at least one of the vendor and the user, by said authentication server, an indication of said authentication of at least one of the vendor and the user; and
   continuing interacting with said first user by said intermediate device in response to said authentication,
   wherein said intermediate device and said authentication server are separated from one another.

2. A method according to claim 1, wherein said intermediate device comprises a vendor World Wide Web site.

3. A method according to claim 2, wherein protecting comprises adding a signature associated with said vendor to said datagram.

4. A method according to claim 2, wherein protecting comprises encrypting said datagram.

5. A method according to claim 1, wherein said intermediate device comprises a user computing device.

6. A method according to claim 5, wherein said computing device adds a time stamp to said datagram.

7. A method according to claim 5, wherein said computing device encrypts said datagram.

8. A method according to claim 7, wherein said encryption uses a one time code.

9. A method according to claim 7, wherein said one time code is provided by a vendor for a particular session with said user.

10. A method according to claim 5, wherein said user computing device uses an embedded software component for said protecting.

11. A method according to claim 10, wherein said embedded software comprises an ActiveX component.

12. A method according to claim 10, wherein said component is cached on said user device.

13. A method according to claim 10, wherein said component requires a property value provided by a vendor to operate.

14. A method according to claim 1, wherein communication between said intermediate device and said server uses a secure connection.

15. A method according to claim 1, wherein different communication paths are used for said authentication and for transaction details from said user.

16. A method according to claim 1, wherein different communication paths are used for said authentication and for transaction details from a vendor to said authentication server.

17. A method according to claim 4, said encrypted datagram including data from at least a first user;
   said method including, after said forwarding, receiving said encrypted datagram by said remote authentication server;
   searching, at said server, for a hash value matching said datagram or a hash thereof;
   generating a validation answer by said remote authentication server, responsive to said search,
   wherein, said datagram includes a secret code and wherein said secret code exists only on said authentication device; and
   outputting said validation answer for authentication of the first user.

18. A method according to claim 17, wherein said authentication device includes a plurality of secret codes that are generated to appear unrelated.

19. A method according to claim 1, further comprising:
generating a code set for the authentication device:
providing a code generating software;
providing at least one seed code for the first user for said software; generating said code set using said software and said seed; destroying said seed immediately after generating said code set; forwarding a first copy of said code set to the first user; and
storing a second copy said code set or an indication thereof on said authentication device;
prior to said authentication, forwarding said first copy to said remote authentication server for authentication of the user; and
authenticating the first user by matching between said first copy and said second copy or said indication thereof.

20. A method according to claim 19, comprising generating hash values for said code set.

21. A method according to claim 20, comprising generating a second set of hash values for said code set, using a different hash function for said second set.

22. A method according to claim 8 wherein said receiving an authentication datagram includes receiving an authentication datagram from at least said user by an intermediate device of a vendor prior to said authentication;
wherein said includes forwarding said authentication datagram to the authentication server for authentication of the vendor when at least an indication of said one time code that matches the vendor is provided with said datagram and forwarding said authentication datagram to the authentication server for authentication of the user when at least an indication of said one time code that matches said user is provided with said authentication datagram.

23. A method according to claim 22, comprising signing said datagram using said one time code by said user.

24. A method according to claim 1 wherein, after said forwarding, said method further comprises:
for each datagram received by the authentication server, matching said datagram or a hash of said datagram to a corresponding table;
for each datagram received, calculating a corresponding counter value from a matching position in said corresponding table; and
for each datagram received, if said authentication datagram is valid, increasing said corresponding counter over a previous counter, within a certain limit; and
for each datagram received, outputting a validation signal for the first user, in response to said corresponding counter value.

25. A method according to claim 24, comprising:
failing said authentication based on said increase being too large; and
allowing a subsequent authentication based on a further increase of said subsequent validation being below a second threshold.

26. A method according to claim 25, wherein said thresholds are the same.

27. A method according to claim 25, wherein said second threshold is smaller than said certain threshold.

28. A method according to claim 24, wherein said counter comprises an ordinal position in said table that is not apparently related to a series of generated random numbers.

29. A method according to claim 1, wherein said authentication datagram additionally includes data from a second user; and
wherein said forwarding includes forwarding said datagram to said authentication server for authentication of the second user.

30. A method according to claim 1, wherein said encrypted datagram additionally includes data from a second user; and
wherein said outputting additionally includes outputting said validation answer for authentication of the second user.

31. A method according to claim 17, wherein said encrypted datagram additionally includes data from a second user; and
wherein said outputting additionally includes outputting said validation answer for authentication of the second user.

32. A method according to claim 19, wherein said remote device is additionally configured for authentication of a second user; and wherein said providing at least one seed code additionally includes providing at least one seed code for the second user for said software.

33. A method according to claim 24, wherein said method is additionally for remote validation of a second user; wherein said receiving additionally includes, from the second user, receiving an authentication datagram by an authentication server from a remote authentication device; and wherein said outputting additionally includes outputting a validation signal for the second user.

34. A method according to claim 2, carried out as part of a commercial interaction between said first user and said vendor, wherein said authentication does not require said first user to interact with a different web server.

35. A method according to claim 1, wherein said receiving, protecting and forwarding is secured by a software component which is downloaded to a computing device associated with said first user and used by said user for sending an interaction request.

36. A method according to claim 2, wherein said forwarded datagram includes payment instructions to said vendor.

37. A method according to claim 35, wherein said forwarding comprises forwarding by said software component.

38. A method according to claim 1, wherein said authentication comprises a single bit authentication answer without an associated explanation.

39. A method according to claim 19, comprising:
storing said code set or an indication thereof on an authentication server; and at a later time,
authenticating said authenticating device by said authentication server by comparing a datagram from said authentication device against said storage at said authentication server.

40. A method according to claim 1, wherein said authentication device comprises a card and wherein said use of an authentication device includes activating the card by pressing a button located on the card.

41. A method according to claim 1, said method further comprising authenticating, using the authentication server, at least the first user by a technique wherein the at least first user is required to input data, the data selected from a PIN, a password, a secret question, voice verification, and a digital signature.

42. A method according to claim 1, wherein said forwarding includes forwarding said protected datagram to said authentication server via the communication network, by said intermediate device, for verification of the intermediate device.

43. A method according to claim 42, wherein said authentication of the first users and said verification of the intermediate device are performed simultaneously.

44. A method according to claim 1, further comprising, before said receiving an interaction request, transmitting an acoustic signal by said authentication device to said intermediate communication device.

45. A method according to claim 1 wherein, after said forwarding, said authentication server transmits an indication of user authentication if said vendor-associated information is verified.

46. A method according to claim 1, wherein said user authentication and said vendor authentication are simultaneously provided.

47. A method according to claim 1, wherein said forwarding includes forwarding said protected datagram for authentication of the vendor.

48. A method according to claim 1, wherein said forwarding includes forwarding said protected datagram for authentication of the user.

49. A method according to claim 1, wherein said forwarding includes forwarding said protected datagram for authentication of both the vendor and the user.

50. A method according to claim 1, wherein said providing includes providing said indication to the vendor.

51. A method according to claim 1, wherein said providing includes providing said indication to the user.

52. A method according to claim 1, wherein said providing includes providing said indication to both the vendor and the user.

53. A method according to claim 1, wherein said authentication of at least one of the vendor and the user includes authentication of both the vendor and the user, and wherein said authentication of both the vendor and the user is performed simultaneously.

* * * * *